United States Patent [19]

Sayles

[11] Patent Number: 5,618,006

[45] Date of Patent: Apr. 8, 1997

[54] SEAT BELT RETRACTOR WITH ENERGY MANAGEMENT

[75] Inventor: Robert D. Sayles, Rochester, Mich.

[73] Assignee: TRW Vehicle Safety Systems Inc., Lyndhurst, Ohio

[21] Appl. No.: 606,200

[22] Filed: Feb. 23, 1996

[51] Int. Cl.$^6$ .................................................. B60R 22/28
[52] U.S. Cl. .................................. 242/379.1; 280/805
[58] Field of Search ..................... 242/379.1; 280/805, 280/806, 807

[56] References Cited

U.S. PATENT DOCUMENTS

| | | | |
|---|---|---|---|
| 3,547,468 | 12/1970 | Giuffrida | 280/805 |
| 3,561,690 | 2/1971 | Muskat . | |
| 3,632,060 | 1/1972 | Balder . | |
| 3,666,198 | 5/1972 | Neumann . | |
| 3,848,828 | 11/1974 | Kuhl | 242/379.1 |
| 4,027,905 | 6/1977 | Shimogawa et al. | 280/746 |
| 4,088,280 | 5/1978 | Arlauskas et al. | 242/379.1 |
| 4,129,321 | 12/1978 | Garvey | 280/744 |
| 4,323,205 | 4/1982 | Tsuge et al. | 280/805 |
| 4,358,136 | 11/1982 | Tsuge et al. | 280/806 |
| 5,211,694 | 5/1993 | Sakakida et al. | 280/806 |
| 5,511,739 | 4/1996 | Dybro et al. | 242/379.1 |

Primary Examiner—John P. Darling
Attorney, Agent, or Firm—Tarolli, Sundheim, Covell, Tummino & Szabo

[57] ABSTRACT

A seat belt webbing retractor (10) includes a spool assembly (60) around which seat belt webbing (16) is wound. The spool assembly (60) is rotatable in webbing withdrawal and webbing retraction directions (A,B). A ratchet wheel (70) is rotatable in the withdrawal and retraction directions (A,B) with the spool assembly (60). A lock pawl (146) is engageable with the ratchet wheel (70) for blocking rotation of the ratchet wheel (70) and the spool assembly (60) in the withdrawal direction (A). The spool assembly (60) is rotatable relative to the ratchet wheel (70) upon an occurrence of a tension above a predetermined amount in the webbing (16). A take-up member (102) is rotatable with the spool assembly (60) relative to the ratchet wheel (70). A deformable member (120) is plastically deformed during a plurality of rotations of the take-up member (102) and spool assembly (60) relative to the ratchet wheel (70). In one embodiment, a plurality of deformable members (266) are included, and a controller (362) controls the deformation of the plurality of deformable members, thereby to change the amount of energy absorption.

39 Claims, 12 Drawing Sheets

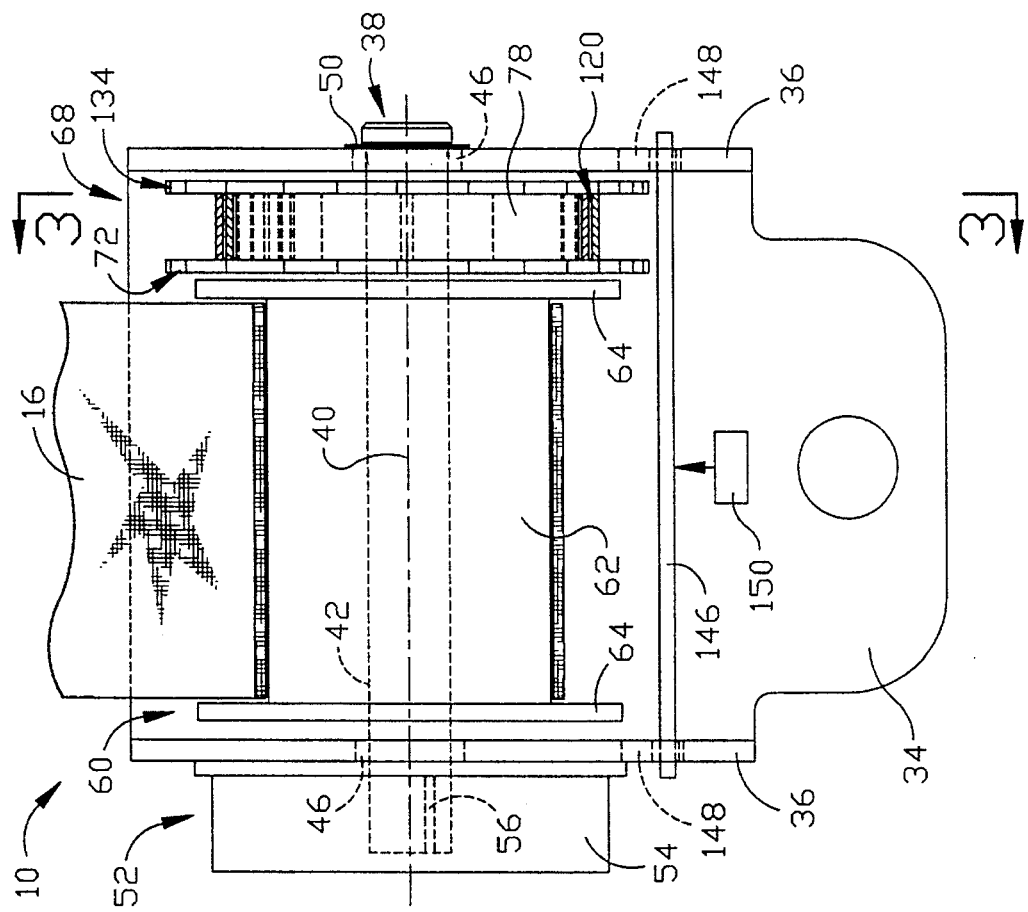
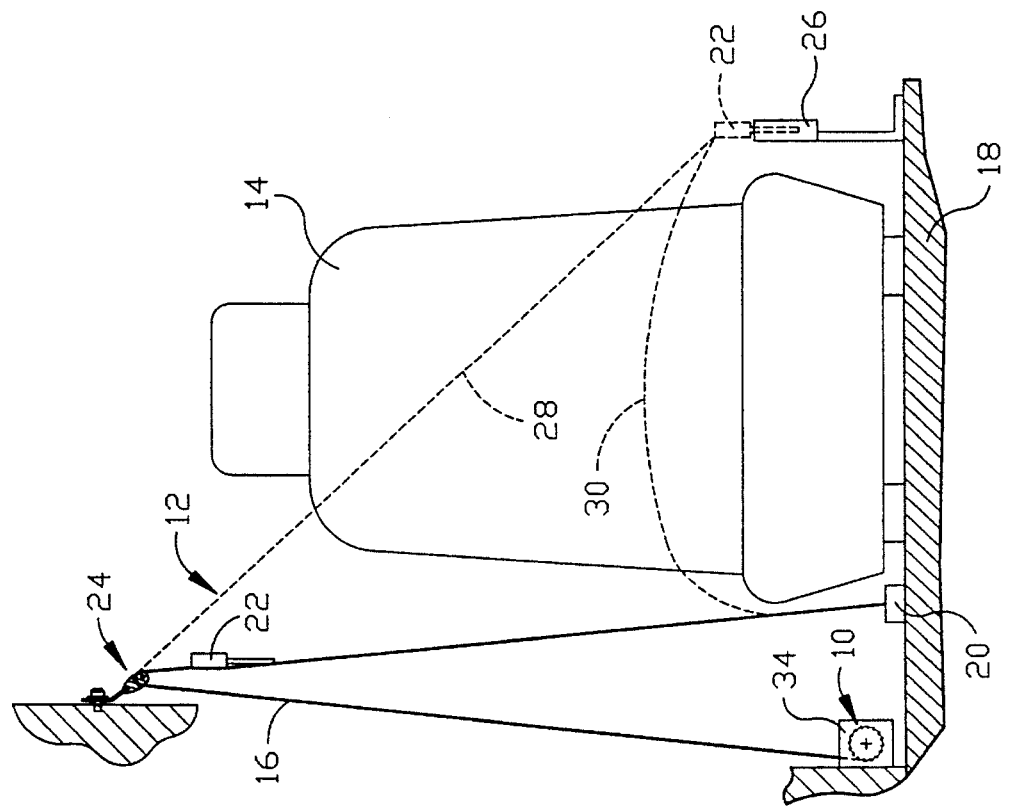

5,618,006

SEAT BELT RETRACTOR WITH ENERGY MANAGEMENT

BACKGROUND OF THE INVENTION

A known seat belt system for restraining an occupant of a vehicle includes seat belt webbing, a seat belt buckle, and a webbing retractor. A tongue is connected to the webbing and is releasably lockable in the buckle when the webbing is extended across the vehicle occupant. The retractor includes a spool upon which the webbing is wound. The spool rotates in a webbing withdrawal direction when the vehicle occupant extracts the webbing from the retractor. A rewind spring in the retractor rotates the spool in a webbing retraction direction to retract the webbing into the retractor.

When the vehicle experiences sudden deceleration, a vehicle occupant using the seat belt system applies a force against the webbing. The force which is applied to the webbing urges the spool to rotate in the withdrawal direction. The retractor includes a blocking mechanism which blocks rotation of the spool in the withdrawal direction in response to sudden vehicle deceleration. Thus, the blocking mechanism prevents further withdrawal of the webbing from the retractor, and the webbing restrains forward movement of the vehicle occupant.

SUMMARY OF THE INVENTION

The present invention relates to a vehicle seat belt webbing retractor. The retractor has a spool around which seat belt webbing is wound. The spool is rotatable in webbing withdrawal and webbing retraction directions. A member is rotatable in the withdrawal and retraction directions with the spool. A means blocks rotation of the rotatable member and the spool in the withdrawal direction. The spool is rotatable relative to the rotatable member upon an occurrence of a tension in the webbing above a predetermined amount.

A deformable member absorbs energy during a plurality of rotations of the spool relative to the rotatable member. The deformable member has a plurality of coils. A means deforms the deformable member during the plurality of rotations of the spool relative to the rotatable member. Preferably, plastic deformation is done to the deformable member. Preferably, the rotatable member has a hollow portion, and the deformable member is coiled outside of the hollow portion prior to deformation and is coiled inside of the hollow portion subsequent to deformation.

In one embodiment, the means for absorbing energy includes deformable means and means for deforming the deformable means. In this embodiment, a means is provided for changing the amount of energy absorption by the means for absorbing energy.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a seat belt webbing restraint system which includes a retractor according to the present invention;

FIG. 2 is a view of the retractor shown in FIG. 1;

DESCRIPTION OF PREFERRED EMBODIMENTS

Figure 5:
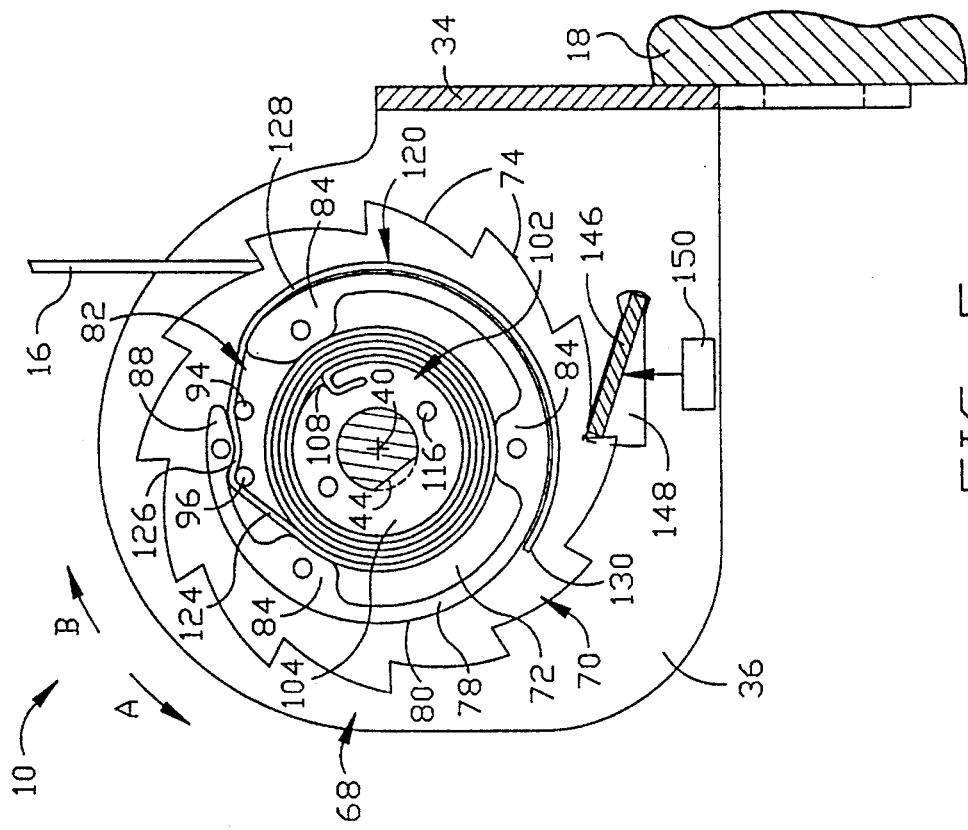
FIG. 5 is a view similar to FIG. 3, but with parts in a different position.

The present invention relates to a retractor for a seat belt webbing restraint system. The present invention is applicable to various retractor constructions and is also applicable to various webbing restraint system configurations. As representative of such constructions and configurations, a retractor 10 in a seat belt webbing restraint system 12 is illustrated in FIG. 1.

During operation of a vehicle, an occupant (not shown) of the vehicle sits on a seat 14 which is illustrated as a front passenger seat in a vehicle. A length of seat belt webbing 16 is extensible about the vehicle occupant. One end of the length of webbing 16 is anchored to the vehicle body 18 at an anchor point 20 located on one side of the seat 14. The opposite end of the webbing 16 is attached to the retractor 10, which is secured to the vehicle body 18 on the same side of the seat as the anchor point 20. Intermediate its ends, the webbing 16 passes through a tongue assembly 22 and a D-ring 24 that is located above both the retractor 10 and the anchor point 20. When the seat belt webbing restraint system 12 is not in use, a portion of the webbing 16 is wound on the retractor 10 and the remainder is oriented generally vertically on the one side of the seat 14, as is shown in solid lines in FIG. 1.

To engage the seat belt webbing restraint system 12, the tongue assembly 22 is manually grasped and pulled across the lap and torso of the occupant sitting in the seat 14. As the tongue assembly 22 is pulled across the lap and torso of the occupant, the tongue assembly moves along the webbing 16 and the webbing is unwound from the retractor 10. When the webbing 16 has been pulled across the lap and torso of the occupant, the tongue assembly 22 is connected with a buckle 26 as shown in dashed lines in FIG. 1. The buckle 26 is connected to the vehicle body 18 and is disposed upon the side of the seat 14 opposite the anchor point 20. When the seat belt webbing restraint system 12 is thus buckled, the length of webbing 16 is divided by the tongue assembly 22 into a torso portion 28 which extends across the torso of the occupant and a lap portion 30 which extends across the lap of the occupant.

Figure 3:
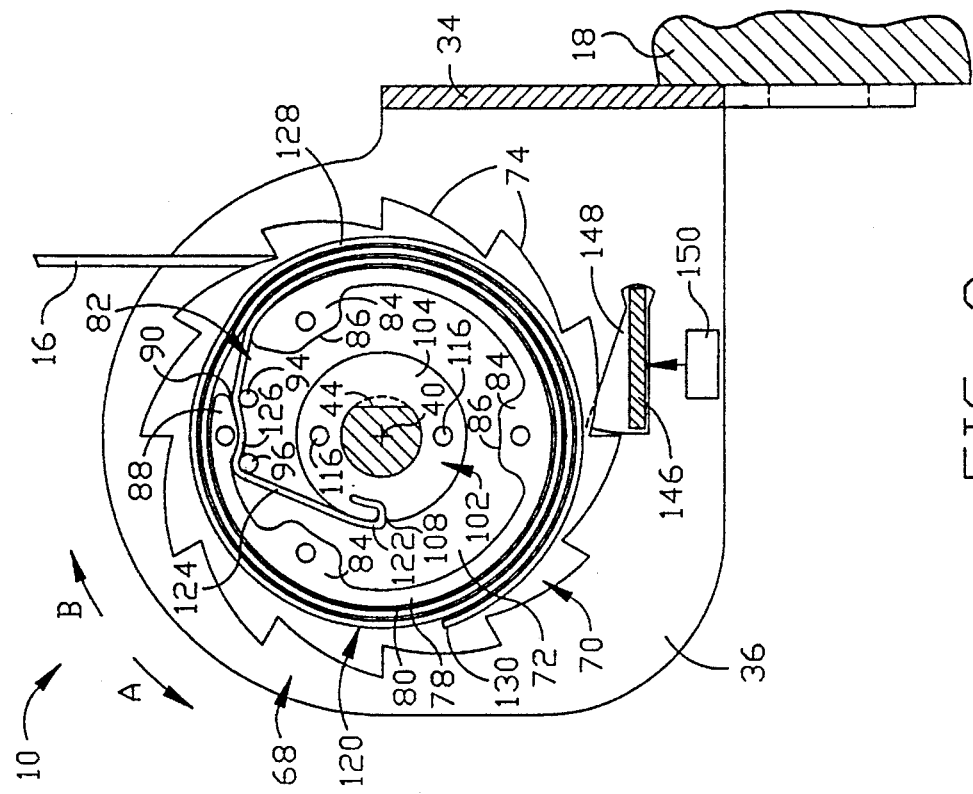
FIG. 3 is a view taken along line 3—3 in FIG. 2.

The retractor 10 includes a metal frame 34 which is adapted to be mounted to a portion of the vehicle body 18. The frame 34 (FIG. 2) is generally U-shaped and has a pair of opposed sides 36. A metal shaft 38 extends along an axis 40. The shaft 38 has a main portion 42 with a flat 44 (FIG. 3).

Two bushings 46 (FIG. 2) are fitted into respective sides 36 of the frame 34. The bushings 46 are made of a suitable material, such as plastic. The bushings 46 receive segments of the shaft 38. The bushings 46, and thus the frame 34, support the shaft 38 for rotation about the axis 40. The shaft 38 is rotatable about the axis 40 relative to the frame 34 in two directions A and B (FIG. 3). These two directions are designated webbing withdrawal and webbing retraction directions, respectively.

Figure 4:
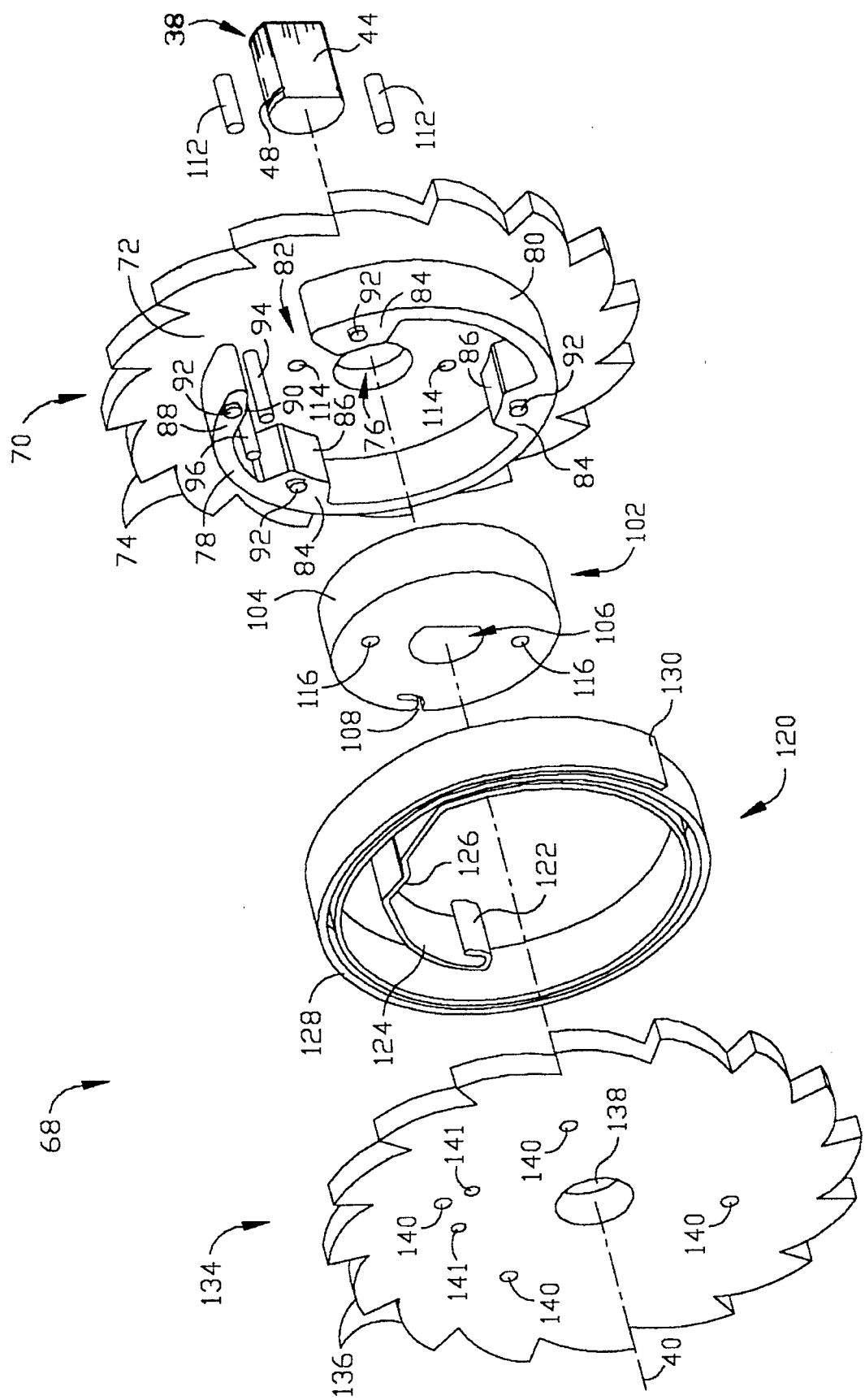
FIG. 4 is an exploded view of certain parts of the retractor of FIG. 2.

An annular groove 48 (FIG. 4) extends into the shaft 38 adjacent to one end of the shaft. The annular groove 48 provides a location for receiving a retainer 50 (FIG. 2) to prevent axial movement of the shaft 38 relative to the frame 34. A similar groove and retainer (not shown) may be provided adjacent to the other end of the shaft 38, also to prevent axial movement of the shaft relative to the frame 34.

The shaft 38 is biased to rotate in the retraction direction B (FIG. 3) by a drive assembly 52 (FIG. 2) of the retractor 10. The drive assembly 52 may have any suitable construction. Preferably, the drive assembly 52 includes a housing 54 which encloses an end portion of the shaft 38, and a coil spring (not shown). The spring is connected between the housing 54 and the shaft 38, and extends into a slot 56 in the shaft 38.

A spool assembly 60 of the retractor 10 is located on the shaft 38. The spool assembly 60 includes a sleeve 62 which is made of a suitable material, such as metal. The sleeve 62 is concentric about the shaft 38, and has a slot (not shown) which extends parallel to the axis 40 and through the sleeve into the interior of the sleeve. The spool assembly 60 includes two disks 64. The disks 64 are preferably metal, but could be made of other suitable material. Each disk 64 is a circular plate which has a smooth outer radial periphery. Each disk 64 has a center hole (not shown), and the center hole of at least one of the disks is D-shaped. Preferably, the rightmost (as viewed in FIG. 2) disk 64 has a D-shaped center hole.

The two disks 64 are located on opposite axial sides of the sleeve 62. The disks 64 are fixed to the sleeve 62 by suitable means such as staking or fasteners (not shown). The shaft 38 extends through the center openings of the disks 64. The main portion 42 with its flat 44 fits snugly into the D-shaped center opening of the one disk 64, and the one disk is fixed for rotation with the shaft. Accordingly, the entire spool assembly 60, including the sleeve 62, is fixed for rotation with the shaft 38.

An end of the webbing 16 is suitably secured to the spool assembly 60. Preferably, the end of the webbing 16 extends through the slot in the sleeve 62 and is sewn into a loop (not shown) about the shaft 38. The webbing 16 extends from the slot of the sleeve 62 and is wrapped to form coils around the sleeve.

When the webbing 16 is pulled from the spool assembly 60 by the vehicle occupant, the spool assembly is rotated in the withdrawal direction A (FIG. 3) against the bias of the drive assembly 52. When the webbing 16 is released from its secured position across the vehicle occupant, the spring of the drive assembly 52 rotates the shaft 38 and the spool assembly 60 in the retraction direction B and the webbing 16 is coiled back on the sleeve 62, as will be understood by those skilled in the art.

The retractor 10 includes a stacked assembly 68 (FIG. 2), which is located on the main portion 42 of the shaft 38 between one side 36 of the frame 34 and the spool assembly 60. The stacked assembly 68 includes a first ratchet wheel 70 (FIG. 4), which is made of suitable material such as metal. A disk portion 72 of the first ratchet wheel 70 is coaxial with the axis 40 and extends perpendicular to the axis. The disk portion 72 has a plurality of teeth 74 located in an annular array extending about the outer radial periphery of the disk portion. Each tooth 74 has a radially extending abutment face and an intersecting sloped face.

A circular center hole 76 extends through the disk portion 72 and is centered on the axis 40. The center hole 76 has a diameter which is slightly larger than the cylindrical diameter of the main portion 42 of the shaft 38. The shaft 38 extends through the center hole 76 of the first ratchet wheel 70 and the first ratchet wheel is rotatable about the axis 40 relative to the shaft.

A hub portion 78 of the first ratchet wheel 70 is preferably formed as a single piece with the disk portion 72. However, the hub portion and the wheel portion may be separate pieces fixed together. The hub portion 78 is an annular wall which projects from the disk portion 72 in an axial direction and which extends about the axis 40. The hub portion 78 is hollow and surrounds an area referred to as the interior of the hub portion. The wall which defines the hub portion 78 has a smooth, cylindrical outer surface 80 located at a radial distance from the axis 40. A slot 82 extends through the wall defining the hub portion 78.

Three lobes 84 are part of the wall defining the hub portion 78 and extend radially into the interior of the hub portion. The lobes 84 have an axial length which is equal to the axial length of the rest of wall defining the hub portion 78. The lobes 84 are spaced from each other along the inner circumferential extent of the wall defining the hub portion 78, and one lobe 84 is adjacent to the slot 82. The lobes 84 have concavely arcuate surface segments 86 which face radially inward toward the axis 40. The surface segments 86 are located at a radial distance from the axis 40.

The wall defining the hub portion 78 has a protrusion 88 located adjacent to the slot 82 and opposite the one lobe 84 at the other side of the slot. The protrusion 88 is also spaced from all of the lobes 84 about the inner circumferential extent of the wall defining the hub portion 78. The protrusion 88 has the same axial length as the rest of the wall defining the hub portion 78 and has a radially inner surface segment 90. The surface segment 90 may have any suitable shape and contour. Preferably, the surface segment 90 is smooth and convexly curved.

Two pins 94 and 96 are provided on the first ratchet wheel 70. The pins 94 and 96 may have any suitable construction.

Preferably, the pins 94 and 96 are solid metal pieces with smooth cylindrical outer surfaces. However, the pins 94 and 96 may each be replaced by a more complex structure such as a roller member on an inner bearing member. Preferably, the pins 94 and 96 have a shear strength of 130,000 psi.

The pins 94 and 96 are mounted on the disk portion 72 and extend parallel to the axis 40. The pins 94 and 96 are located within the interior of the hub portion 78, near the protrusion 88. The pin 94 is located adjacent to the slot 82 and adjacent to one end of the surface segment 90 on the protrusion 88. A small gap exists between the pin 94 and the surface segment 90. The pin 96 is located adjacent to the other end of the surface segment 90 and away from the pin 94. A small gap exists between the pin 96 and the surface segment 90. The pins 94 and 96 axially extend out from the hub portion 78.

A take-up member 102 of the stacked assembly 68 is coaxial with the axis 40. The take-up member 102 may be made of any suitable material, such as metal. The take-up member 102 has a cylindrical outer circumferential surface 104. A slot 108 extends into the take-up member 102 from the outer surface 104. The slot 108 preferably has a fishhook shape. A D-shaped center hole 106 extends through the take-up member 102 and is centered on the axis 40. The center hole 106 of the take-up member 102 has a diameter so that the main portion 42 of the shaft 38 fits snugly into the center hole 106. Accordingly, the take-up member 102 is fixed for rotation with the shaft 38. The take-up member 102 is located in the interior of the hub portion 78 of the first ratchet wheel 70. An annular space exists between the take-up member 102 and the lobes 84.

Two shear pins 112 extend through holes 114 in the disk portion 72 of the first ratchet wheel 70 and extend into holes 116 in the take-up member 102. Alternatively, the shear pins 112 may be formed as a single piece with the first ratchet wheel 70. The shear pins 112 may be made of any suitable material, such as metal. The shear pins 112 hold the take-up member 102 against rotation relative to the first ratchet wheel 70 until a predetermined rotational force causes the take-up member to shear the shear pins and permit rotation of the take-up member relative to the first ratchet wheel. Preferably, the webbing force needed to shear the shear pins 112 is approximately 500 lbs.

Figure 6:
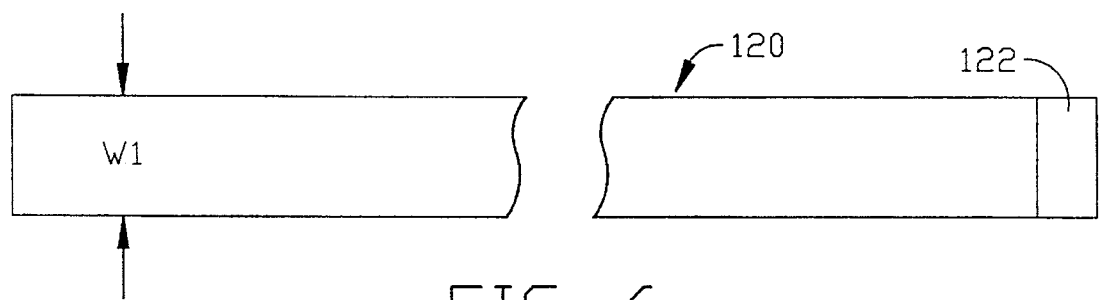
FIG. 6 is a fragmentary view of a member in the retractor of FIG. 2.

The stacked assembly 68 includes a band member 120 which is formed from a relatively long strip of material (FIG. 6). Any suitable material may be used for the band member 120, but the preferred material is high strength steel known as full hard, 302 steel which is heat treated to have a tensile strength of approximately 265,000 psi and a yield strength of approximately 250,000 psi. The band member 120 may have any suitable size and shape. Preferably, as shown in FIG. 6, the band member 120 has a width W1 which is constant along its entire length. In one embodiment, the width is approximately three-eights of an inch. Also, the band member 120 has a thickness which is preferably constant along its length. In one embodiment, the thickness is approximately twenty-five thousandths of an inch.

The band member 120 (FIG. 4) has a hook end 122. The hook end 122 is the same shape as the slot 108 in the take-up member 102. Extending from the hook end 122 is a short coil segment 124 which has a smooth arcuate bend. Adjacent to the coil segment 124 is a pre-bent segment 126. The pre-bent segment 126 has a series of relatively sharp bends and has a wave-like appearance. A relatively long coiled segment 128 extends from the end of the pre-bent segment 126. The coiled segment 128 includes a plurality of coils which extend about the axis 40. The coils overlie each other and have a common center on the axis 40. The band member 120 has a trailing end 130 at the end of the radially outermost coil.

The hook end 122 (FIG. 3) of the band member 120 is located within the slot 108 of the take-up member 102. The coil segment 124 extends partially along the outer surface 104 of the take-up member 102 and, at a point along the outer surface 104, the coil segment 124 extends away from the take-up member 102 toward the pin 96. The pre-bent segment 126 is in engagement with pins 94 and 96 and the surface segment 90. The pre-bent segment 126 extends radially outward of the pin 96, through the gap between the pin 96 and the surface segment 90, along the surface segment 90, radially outward of the pin 94, and through the gap between the pin 94 and the surface segment 90. The coiled segment 128 extends through the slot 82 to the outside of the hub portion 78 of the first ratchet wheel 70 and is supported on the hub portion. The innermost coil of the coiled segment 128 is in engagement with the outer surface 80 of the hub portion 78. The coils extend around the hub portion 78 in a radially expanding spiral.

A second ratchet wheel 134 (FIG. 4) of the stacked assembly 68 is coaxial with the axis 40 and is parallel to the disk portion 72 of the first ratchet wheel 70. The second ratchet wheel 134 is made of any suitable material, such as metal. The second ratchet wheel 134 has a plurality of teeth 136 which are located in an annular array extending about the outer radial periphery of the second ratchet wheel. Each tooth 136 has a radially extending abutment face and an intersecting sloped face. The teeth 136 have the same shape as the teeth 74 on the first ratchet wheel 70 and the number of teeth 136 is the same as the number of teeth 74. The radial distance between the axis 40 and the array of teeth 136 is the same as the radial distance between the axis and the array of teeth 74, and the teeth 136 overlie the teeth 74 in an axial direction.

A circular center hole 138 extends through the second ratchet wheel 134 and has a center on the axis 40. The diameter of the center hole 138 is slightly larger than the cylindrical diameter of the main portion 42 of the shaft 38. The shaft 38 extends through the center hole 138 of the second ratchet wheel 134, and the second ratchet wheel is rotatable about the axis 40 on the shaft. Four holes 140 extend through the second ratchet wheel 134. The holes 140 are aligned in an axial direction with four staking elements 92 on the hub portion 78 of the first ratchet wheel 70. The staking elements 92 are preferably located at the lobes 84 and the protrusion 88. Two holes 141 extend through the second ratchet wheel 134. The holes 141 are aligned in an axial direction with the pins 94 and 96.

The staking elements 92 of the first ratchet wheel 70 extend through the holes 140 of the second ratchet wheel 134, and the first and second ratchet wheels are fixed together for rotation on the shaft 38. The pins 94 and 96 extend through the holes 141. The take-up member 102 and a portion of the band member 120 are axially held within the hub portion 78 of the first ratchet wheel 70 by the second ratchet wheel 134. Also, the coiled segment 128 of the band member 120 is restrained axially on the outside of the hub portion 78 between the disk portion 72 of the first ratchet wheel 70 and the second ratchet wheel 134.

The retractor 10 has a lock pawl 146 (FIG. 2) which is made of a suitable material such as metal. The lock pawl 146 extends between the two sides 36 of the frame 34. The ends of the lock pawl 146 adjacent the sides 36 of the frame 34 extend into openings 148 in the sides 36. The openings 148 are shaped to permit pivoting of the lock pawl 146. The lock pawl 146 is pivotable to engage the teeth 74 and 136 on the first and second ratchet wheels 70 and 134, respectively.

An actuator 150 (schematically shown) of the retractor 10 is located adjacent to the lock pawl 146. The actuator 150 is a mechanism for causing the lock pawl 146 to pivot. The actuator 150 may be any suitable mechanism. For example, the actuator 150 may be a mechanical inertia-sensitive device which pushes upward on the lock pawl 146 in response to a sudden change in vehicle velocity which exceeds a predetermined change in velocity, such as occurs during a vehicle collision. Alternatively, the actuator 150 may be an electro-mechanical device which causes the lock pawl 146 to pivot in response to an electrical signal provided by a sensor mechanism (not shown). The sensor mechanism detects a condition indicative of vehicle deceleration above a predetermined deceleration such as occurs in a collision. Accordingly, the actuator 150 causes the lock pawl 146 to pivot in response to a condition which is indicative of a collision of the vehicle.

When a vehicle occupant (not shown) pulls the webbing 16 across his or her torso to secure the webbing, the webbing causes the spool assembly 60 to rotate in the withdrawal direction A (FIG. 3). The shaft 38 (FIG. 2) rotates with the spool assembly 60, against the bias provided by the drive assembly 52. In addition, the take-up member 102 is rotated with the shaft 38 because of the engagement of the flat 44 on the shaft 38 by the D-shaped surface that defines the center hole 106 of the take-up member 102. During this rotation of the take-up member 102, the first and second ratchet wheels 70 and 134 are also rotated with the take-up member 102 such that the stacked assembly 68 rotates as a unit.

The rotation of the stacked assembly 68 as a unit is the result of the shear pins 112 remaining intact and extending between the first ratchet wheel 70 and the take-up member 102. Thus, the shaft 38, the spool assembly 60 and the entire stacked assembly 68 rotate as a unit. The position of the take-up member 102 remains unchanged relative to the first ratchet wheel 70. Also, the position of the band member 120 relative to the take-up member 102 and the first ratchet wheel 70 remains unchanged. Specifically, the pre-bent segment 126 remains in intertwined engagement with the pins 94 and 96 and the surface segment 90.

When the vehicle is stopped and the vehicle occupant is preparing to leave the vehicle, the webbing 16 is released from across the vehicle occupant and the drive assembly 52 biases the shaft 38 to rotate in the retraction direction B. The spool assembly 60 is rotated with the shaft 38 in the retraction direction B such that the webbing 16 is coiled back onto the spool assembly 60. In addition, the stacked assembly 68 also rotates as a unit. Specifically, there is no relative rotation between the take-up member 102 and the first and second ratchet wheels 70 and 134.

During use of the vehicle with webbing 16 secured across the vehicle occupant, a collision may occur. During the collision, the vehicle will suddenly decelerate. In response to a condition indicative of the collision, the actuator 150 causes the lock pawl 146 to pivot upward (as shown in FIG. 5) and engage the abutment faces of the teeth 74 and 136 of the first and second ratchet wheels 70 and 134, respectively. The first and second ratchet wheels 70 and 134 are blocked and prevented from further rotation in the withdrawal direction A. The shear pins 112 extending from the now stationary first ratchet wheel 70 initially prevent further rotation of the take-up member 120 in the withdrawal direction A.

Accordingly, the take-up member 102 is held stationary. The stationary take-up member 102 prevents rotation of the shaft 38 because of the engagement between the take-up member and the flat 44 on the shaft. Thus, the shaft 38 and the spool assembly 60 are initially prevented from rotating in the withdrawal direction A. The amount of webbing 16 which extends across the vehicle occupant is momentarily fixed.

The vehicle occupant presses upon the webbing 16 because the vehicle occupant tends to move relative to the vehicle during the collision due to inertia. The tension force in the webbing 16 is increased. The tension force is transmitted to the spool assembly 60 and urges the spool assembly and the shaft 38 to rotate in the withdrawal direction A. The shaft 38 transmits a rotational force to the take-up member 102 because of the engagement of the flat 44 with the take-up member 102. The take-up member 102 presses against the shear pins 112 at the portions of the shear pins which extend into the holes 116.

A pressing force from the take-up member 102 above a predetermined amount causes the shear pins 112 to fracture and shear so that the portions of the shear pins 112 located within the holes 116 are separated from the remaining portions of the shear pins. The take-up member 102 is no longer constrained by the shear pins 112 and the take-up member may rotate in the withdrawal direction A relative to the first and second ratchet wheels 70 and 134.

The take-up member 102 pulls on the hook end 122 of the band member 120. The band member 120 at the pre-bent segment 126 is urged to move through the tortuous path defined between the pins 94 and 96 and the surface segment 90. If the force urging the band member 120 is above a predetermined amount, the band member undergoes plastic deformation and is guided to move through the tortuous path. The take-up member 102, the shaft 38 and the spool assembly 60 rotate in the withdrawal direction A. There is resistance to the rotation because of the resistance of the band member 120 to deformation.

As each portion of the coiled segment 128 moves through the slot 82, it is bent to pass through the gap between the pin 94 and the surface segment 90. Subsequently, the portion of the coiled segment 128 is bent around the arcuate surface segment 90 to pass through the gap between the pin 96 and the surface segment 90. The portion of the band member 120 is then pulled around the pin 96 and coiled onto the take-up member 102.

As the band member 120 is pulled, the coils in the coiled segment 128 are pulled along the outside of the hub portion 78. Specifically, the radially innermost coil slides on the outer surface 80. The coils are sequentially pulled into the interior of the hub portion 78 to be deformed, proceeding from the radially innermost coil engaging the hub portion to the outermost coil.

The take-up member 102 is permitted to rotate for a plurality of rotations. Each rotation of the take-up member 102 causes a coil layer of the band member 120 to be added onto the outside of the take-up member 102 within the hub portion 78. As the number of coil layers on the take-up member 102 is increased, the distance between the coil layers and the surfaces 86 on the lobes 84 is decreased. After a sufficient amount of the band member 120 is coiled onto the take-up member 102, the distance between the coils on the take-up member 102 and the surfaces 86 is reduced such that the outer coil layer is in engagement with the surfaces 86 on the lobes 84.

The surfaces 86 on the lobes 84 fictionally engage the outer coil layer to resist rotation of the take-up member 102 and the coil layers coiled about the take-up member 102. At some point, additional layers of the band member 120 will not fit radially within the surfaces 86 on the lobes 84, and rotation of the take-up member 102 is arrested. The arresting of the take-up member 102 occurs while some portion of the coiled segment 128 is still located outside of the hub portion 78. Accordingly, the trailing end 130 never enters the hub portion 78.

As the take-up member 102 is permitted to rotate in the withdrawal direction A, the shaft 38 and the spool assembly 60 rotate with the take-up member 102 relative to the stationary first and second ratchet wheels 70 and 134. During rotation of the spool assembly 60 in the withdrawal direction A, an amount of webbing 16 is uncoiled from the spool assembly 60 under the tension which is created in the webbing by the vehicle occupant, and the vehicle occupant is permitted to move forward some amount. Preferably, the retractor 10 is used in conjunction with an inflatable occupant restraint commonly known as an air bag. The occupant moves into the inflated air bag as the band member 120 is rotated onto the take-up member 102.

The deformation of the band member 120 is not instantaneous but instead occurs over a period of time. During this time period, the webbing 16 does not fully block forward movement of the vehicle occupant. Occupant deceleration resulting from engagement with the webbing 16 occurs over a longer period of time than it would if the webbing 16 were connected to a spool sleeve fixed to stationary ratchet wheels. In addition, the deformation of the band member 120 reduces the webbing restraining force acting on the vehicle occupant. Thus, the work required to restrain the occupant is applied over a longer period of time, reducing the peak restraining load.

The principle for conservation of energy states that the total occupant kinetic crash energy is $\frac{1}{2} M (V_i^2-V_f^2)$, where M is the occupant's mass, $V_i$ is the velocity of the vehicle occupant at the beginning of the crash and $V_f$ is the velocity of the vehicle occupant at the end of the crash. The total occupant crash energy is dissipated by performing work on the vehicle occupant. Work, which is a force applied over a distance, must be performed on a vehicle occupant to stop its motion. During a collision, work is performed on a vehicle occupant by a variety of means, including physical absorption by the occupant, interaction between the occupant and the vehicle seat, and interaction between the occupant and the webbing 16. Kinetic energy of the moving occupant is absorbed and dissipated during the deformation of the band member 120.

Figure 7:
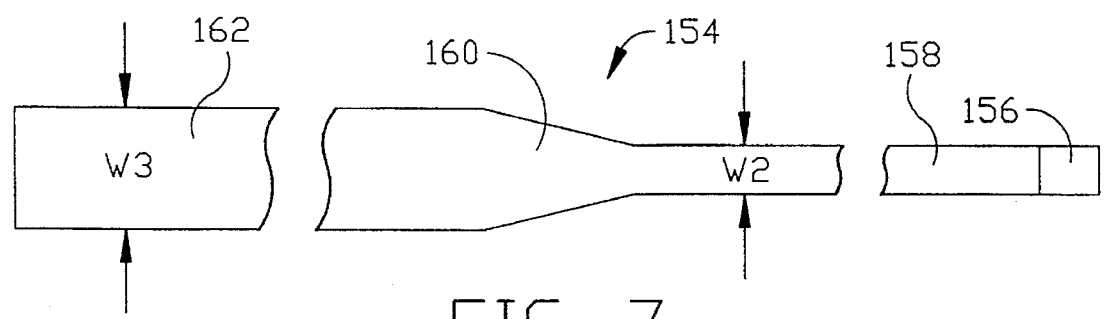
FIG. 7 is a fragmentary view of a member which may be substituted for the member shown in FIG. 6.

Different band members may be used in the retractor 10 to achieve different performance profiles regarding when and how much energy is absorbed during deformation of the band member. For example, FIG. 7 illustrates a band member 154 which may be substituted for the band member 120 (FIG. 2) in the retractor 10. The band member 154 (FIG. 7) is made of any suitable material, and is preferably high strength steel. Preferably, the thickness of the material is constant along the length of the band member 154.

A hook end 156 of the band member 154 is located within the slot 108 (FIG. 4) of the take-up member 102. A first segment 158 (FIG. 7) of the band member 154 extends from the hook end 156. The first segment 158 has a width W2 and extends along a portion of the overall length of the band member 154 to a second segment 160. The second segment 160 tapers outward from the width W2 to a width W3, which is larger than the width W2. A third segment 162 extends from the tapered segment 160 to the end of the band member 154 and has a constant width W3.

Because the first segment 158 has a width less than the third segment 162, the firsts segment is less resistant to deformation. Accordingly, more energy is absorbed by the band member 154 during deformation of the third segment 162 than during deformation of the first segment 158 or the second segment 160. As the band member 154 is pulled, a first amount of force is required during movement of the first segment 158 through the torturous path defined by the pins 94 and 96 (FIG. 4) and the surface segment 90. As the tapered segment 160 (FIG. 7) is pulled through the tortuous path, resistance to deformation increases, and the amount of force required to pull the band member 154 is increased. The increased amount of force is also required during movement of the third segment 162 through the tortuous path.

Figure 8:
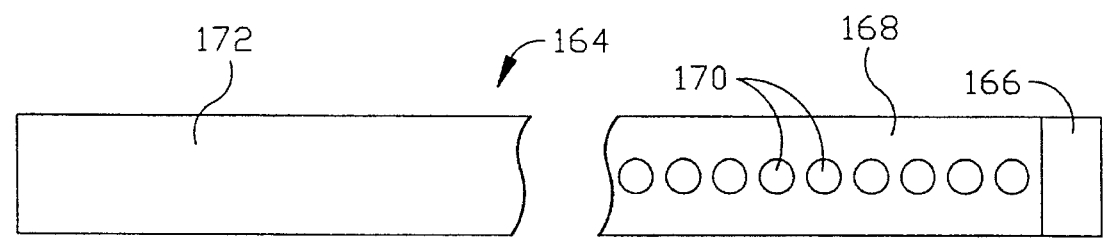
FIG. 8 is a fragmentary view of another member which may be substituted for the member shown in FIG. 6.

FIG. 8 illustrated a band member 164 which also may be substituted for the band member 120 (FIG. 2) in the retractor 10. The band member 164 (FIG. 8) is made of any suitable material, and is preferably high strength steel. Preferably, the width and the thickness of the material are constant along the length of the band member 164. A hook end 166 of the band member 164 is located within the slot 108.

A first segment 168 of the band member 164 is adjacent to the hook end 166 has a plurality of holes 170 spaced along the length of the first segment. The holes 170 may have any suitable shape. In one preferred embodiment, the holes 170 are circular. However, the holes may be elongate in any direction. A second segment 172 of the band member 164 extends from the first segment and is solid, i.e., without holes.

Resistance to deformation increases at the junction between the first and second segments 168 and 172. As the first segment 168 is pulled through the tortuous path defined by the pins 94 and 96 and the surface segment 90 (FIG. 4), a first amount of force is required. As the second segment 172 (FIG. 8) is pulled through the tortuous path, a greater amount of force is required. A lesser amount of energy is absorbed during deformation of the first segment 168 than during deformation of the second segment 172.

Figure 9:
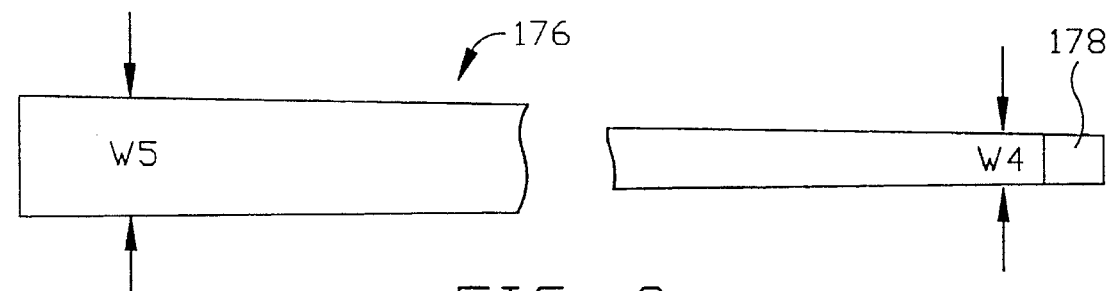
FIG. 9 is a fragmentary view of another member which may be substituted for the member shown in FIG. 6.

FIG. 9 illustrates a band member 176 which also may be substituted for the band member 120 (FIG. 2) in the retractor 10. The band member 176 (FIG. 9) is made of any suitable material, and is preferably high strength steel. Preferably, the thickness of the material is constant along the length of the band member 176. A hook end 178 of the band member 176 is located within the slot 108.

The band member 176 has a width which is tapered along its entire extent from a relatively narrow width W4, adjacent to the hook end 178, to a relatively wide width W5 at the other end. As the band member 176 is pulled through the tortuous path defined by the pins 94 and 96 and the surface segment 90 (FIG. 4), the amount of force required to pull the band member 176 increases because of increased resistance. Energy absorption increases as the band member 176 progresses through the tortuous path.

The band members 154, 164 and 176 (FIGS. 7–9) provide resistance to deformation which is initially relatively small and then relatively large. It should be understood that a band member which initially provides a relatively large resistance and then as relatively small resistance could also be substituted for the band member 120 (FIG. 2) in the retractor 10. For example, such a band member could have a relatively large width adjacent to a hook end and a relatively small width away from the hook end.

Figure 10:
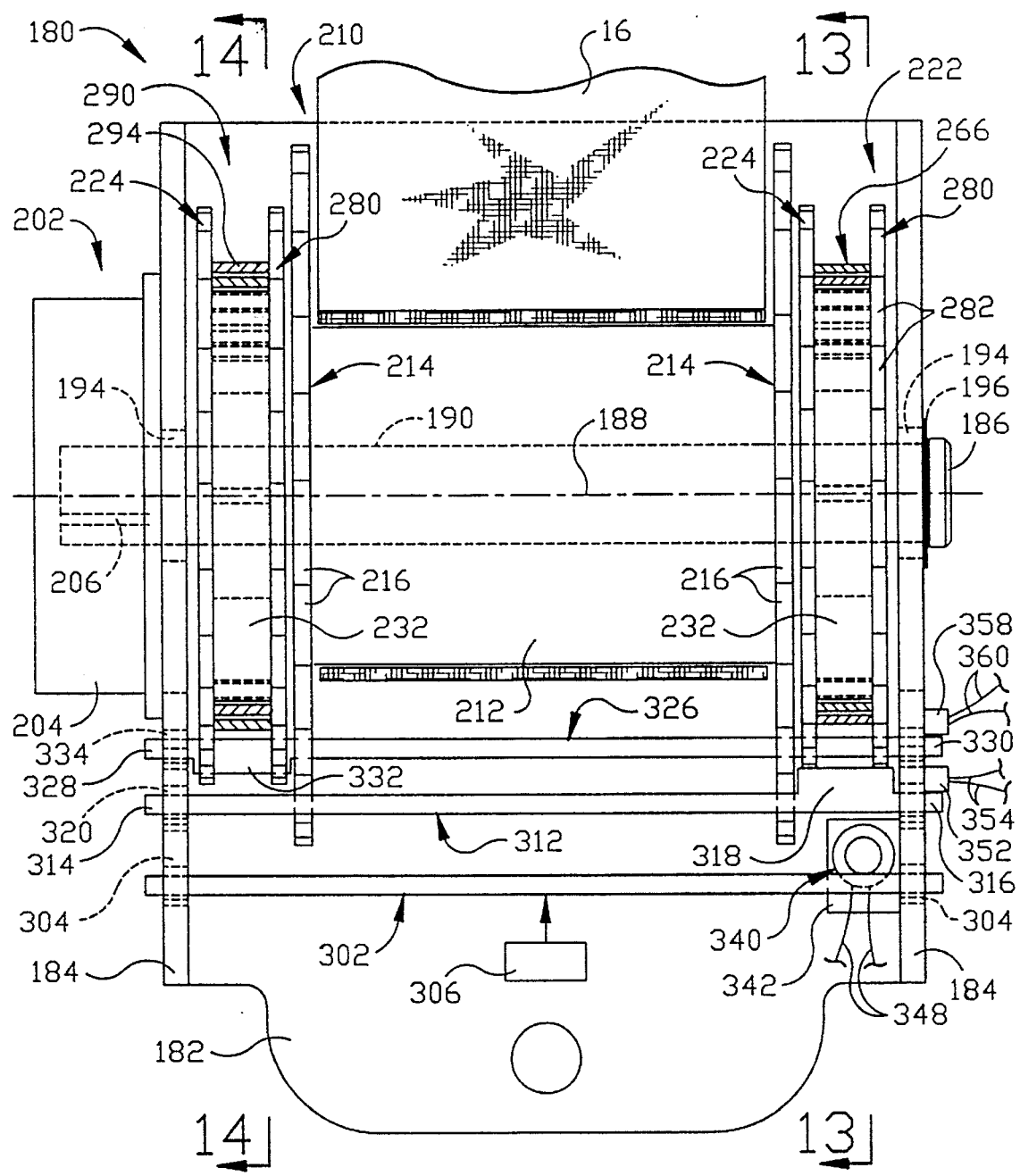
FIG. 10 is a view of a retractor which is a second embodiment of the present invention, with some structure schematically illustrated.
Figure 13:
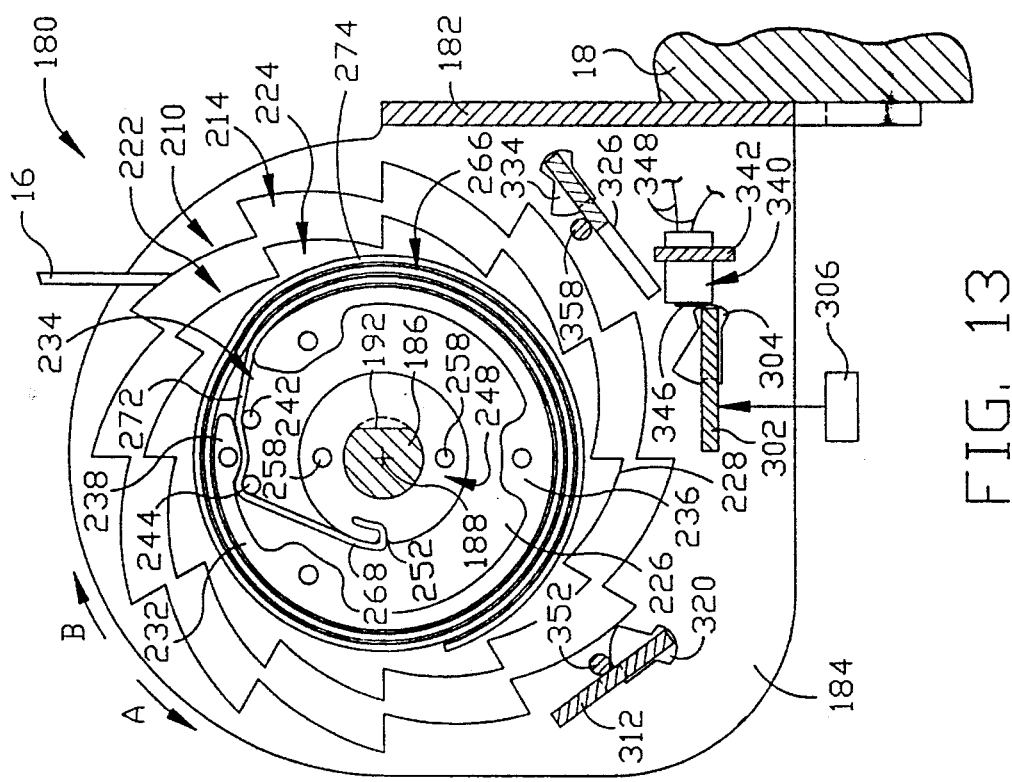
FIG. 13 is a view taken along line 13—13 in FIG. 10.

A retractor 180 accordingly to a second embodiment of the present invention is illustrated in FIG. 10. The retractor 180 includes a metal frame 182 which is adapted to be mounted on a portion of the vehicle body 18 (FIG. 13). The frame 182 (FIG. 11) is generally U-shaped and has a pair of opposed sides 184. A metal shaft 186 (FIG. 10) of the retractor 180 extends along an axis 188. The shaft 186 has a main portion 190 with a flat 192 (FIG. 13).

Two bushings 194 (FIG. 10) are fitted into the respective sides 184 of the frame 182. The bushings 194 are made of a suitable material, such as plastic. The bushings 194 receive segments of the shaft 186. The bushings 194, and thus the frame 182, support the shaft 186 for rotation about the axis 188. The shaft 186 is rotatable about the axis 188 relative to the frame 182 in two directions A and B (FIG. 13). These two directions are designated webbing withdrawal and webbing retraction directions, respectively. A suitable means prevents axial movement of the shaft 186 relative to the frame 182. For example, the means may comprise a retainer 196 (FIG. 10).

The shaft 186 is biased to rotate in the retraction direction B by a drive assembly 202 of the retractor 180. The drive assembly 202 may have any suitable construction. Preferably, the drive assembly 202 includes a housing 204 which encloses an end portion of the shaft 186 and a coil spring (not shown). The spring is connected between the housing 204 and the shaft 186, and extends into a slot 206 in the shaft 186.

A spool assembly 210 of the retractor 180 is located on the shaft 186. The spool assembly 210 includes a sleeve 212 which is made of a suitable material, such as metal. The sleeve 212 is concentric about the shaft 186, and has a slot (not shown) which extends parallel to the axis 188 and into the interior of the sleeve.

Figure 12:
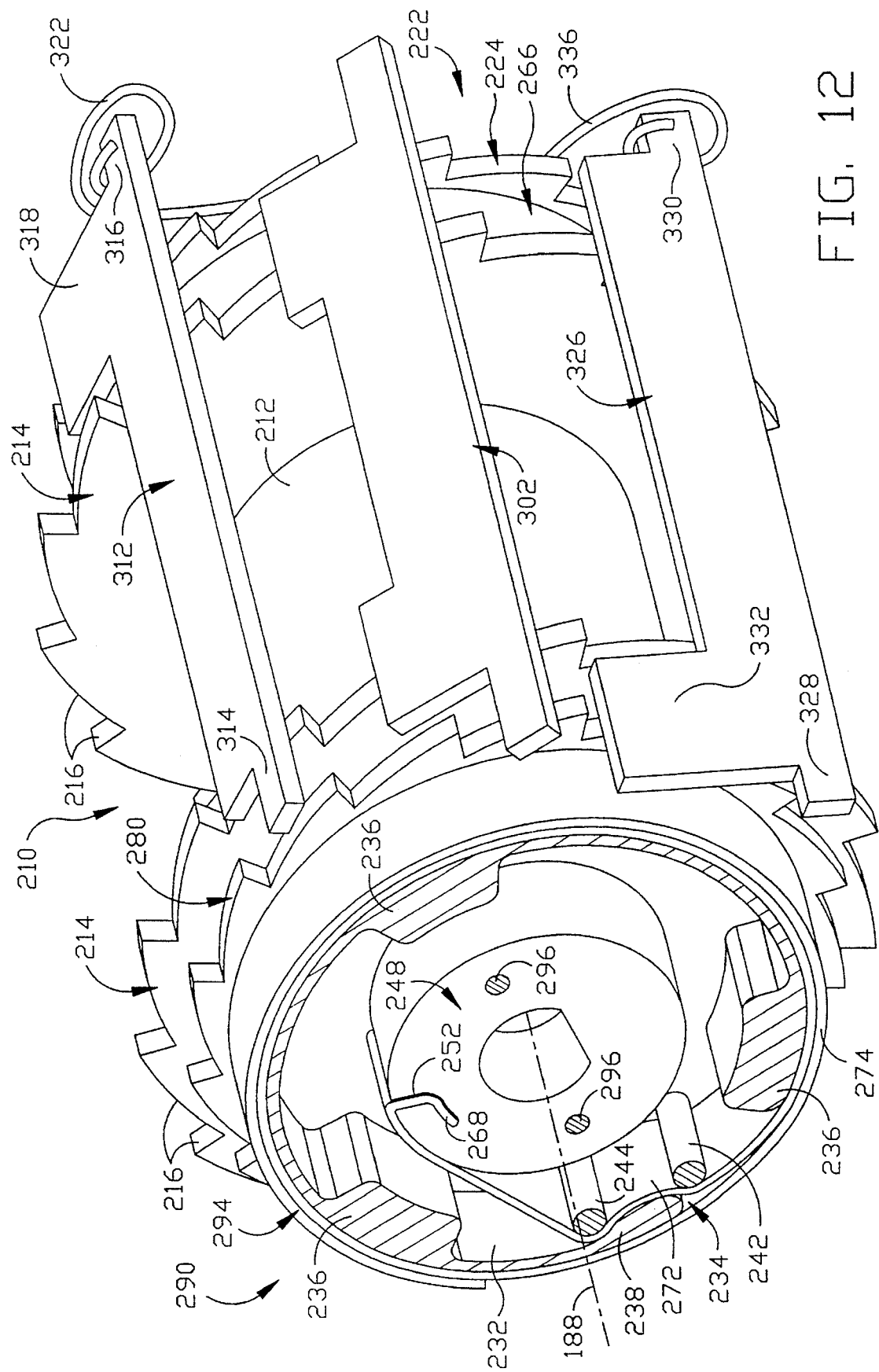
FIG. 12 is an enlarged perspective view of certain parts of the retractor of FIG. 10.

The spool assembly 210 includes two ratchet wheels 214 which are preferably metal, but could be made of other suitable material. Each ratchet wheel 214 is a plate with a center hole (not shown). At least one of the ratchet wheels has a D-shaped center hole. Each ratchet wheel 214 has a plurality of teeth 216 (FIG. 12) located in an annular array extending about the outer radial periphery of the ratchet wheel. Each tooth 216 has a radially extending abutment face and an intersecting sloped face.

The two ratchet wheels 214 are located on opposite axial sides of the sleeve 212, and are fixed to the sleeve 212 by suitable means such as staking or fasteners (not shown). The shaft 186 (FIG. 10) extends through the center openings of the ratchet wheels 214. The main portion 190 with its flat 192 fits snugly into the D-shaped center opening of the one ratchet wheel 214, and the one ratchet wheel is fixed for rotation with the shaft. Accordingly, the entire spool assembly 210, including the sleeve 212, rotates with the shaft 186.

An end of the webbing 16 is suitably secured to the spool assembly 210. Preferably, the end of the webbing 16 extends through the slot in the sleeve 212 and is sewn into a loop (not shown) about the shaft 186. The webbing 16 extends from the slot of the sleeve 212 and is wrapped around the sleeve to form coils around the sleeve.

When the webbing 16 is pulled from the spool assembly 210 by the vehicle occupant, the spool assembly is rotated in the withdrawal direction A against the bias of the drive assembly 202. When the webbing 16 is released from its secured position across the vehicle occupant, the spring of the drive assembly 202 rotates the shaft 186 and the spool assembly 210 in the retraction direction B and the webbing 16 is wound back onto the sleeve 212, as will be understood by those skilled in the art.

The retractor 180 includes a first stacked assembly 222, which is located on the main portion 190 of the shaft 186 between one side 184 of the frame 182 and the spool assembly 210. The first stacked assembly 222 includes a first ratchet wheel 224, which is made of a suitable material, such as metal. A disk portion 226 (FIG. 13) of the first ratchet wheel 224 is coaxial with the axis 188 and extends perpendicular to the axis.

The disk portion 226 has a plurality of teeth 228 located in an annular array extending about the outer radial periphery of the disk portion. Each tooth 228 has a radially extending abutment face and an intersecting sloped face. The radial distance from the axis 188 to the array of teeth 228 on the first ratchet wheel 224 is less than the radial distance to the array of teeth 216 on the ratchet wheels 214 of the spool assembly 210. Thus, the first ratchet wheel 224 has a diameter smaller than the diameter of the ratchet wheels 214.

A circular center hole extends through the disk portion 226 of the first ratchet wheel 224 and is centered on the axis 188. The center hole in the disk portion 226 has a diameter which is slightly larger than the cylindrical diameter of the main portion 190 of the shaft 186. The shaft 186 extends through the center hole of the disk portion 226, and the first ratchet wheel 224 is rotatable about the axis 188 relative to the shaft.

A hub portion 232 of the first ratchet wheel 224 is preferably formed as a single piece with the disk portion 226. However, the hub portion 232 and the disk portion 226 may be separate pieces fixed together. The hub portion 232 is an annular wall which projects from the disk portion 226 in an axial direction and extends about the axis 188. The hub portion 232 is hollow and surrounds an area referred to as the interior of the hub portion. A slot 234 extends through the wall defining the hub portion 232.

Three lobes 236 are part of the wall defining the hub portion 232 and extend radially into the interior of the hub portion. The lobes 236 have an axial length which is equal to the axial length of the rest of the wall defining the hub portion 232. The lobes 236 are spaced from each other along the inner circumferential extent of the wall defining the hub portion 232, and one lobe is adjacent to the slot 234. The lobes 236 have inner surface segments which face radially inward toward the axis 188. The inner surface segments of the lobes 236 are concavely arcuate, and are located at a radial distance from the axis 188.

The wall defining the hub portion 232 has a protrusion 238 located adjacent to the slot 234 and opposite the one lobe 236 at the other side of the slot. The protrusion 238 is spaced from all of the lobes 236 about the inner circumferential extent of the wall defining the hub portion 232. The protrusion 238 has the same axial length as the rest of the wall defining the hub portion 232 and has a radially inner surface segment. The inner surface segment of the protrusion 238 may have any suitable shape and contour. Preferably, the inner surface segment of the protrusion 238 is smooth and convexly curved.

Two pins 242 and 244 are provided on the first ratchet wheel 224. The pins 242 and 244 may have any suitable construction. Preferably, the pins 242 and 244 are solid metal pieces with smooth cylindrical outer surfaces. The pins 242 and 244 are mounted on the disk portion 226 and extend parallel to the axis 188. The pins 242 and 244 are located within the interior of the hub portion 232 near the protrusion 238. The pin 242 is located adjacent to the slot 234 and adjacent to one end of the protrusion 238, and a small gap exists between the pin 242 and the protrusion. The pin 244 is located adjacent to the other end of the protrusion 238 and away from the pin 242, and a small gap exists between the pin 242 and the protrusion. The pins 242 and 244 axially extend out from the hub portion 232.

A take-up member 248 of the first stacked assembly 222 is coaxial with the axis 188. The take-up member 248 may be made of any suitable material, such as metal. The take-up member 248 has a cylindrical outer surface. A slot 252 extends into the take-up member 248 from the outer surface of the take-up member, and preferably has a fish-hook shape.

A D-shaped center hole extends through the take-up member 248 and is centered on the axis 188. The center hole of the take-up member 248 has a diameter so that the main portion 190 of the shaft 186 fits snugly into the center hole. Accordingly, the take-up member 248 is fixed for rotation with the shaft 186. The take-up member 248 is located in the interior of the hub portion 232 of the first ratchet wheel 224. An annular space exists between the take-up member 248 and the lobes 236.

Two shear pins 258 extend through holes in the disk portion 226 of the first ratchet wheel 224 and extend into holes in the take-up member 248. The shear pins 258 may be made of any suitable material, such as metal. The shear pins 258 hold the take-up member 248 against rotation relative to the first ratchet wheel 224 until a predetermined rotational force causes the take-up member to shear the shear pins and permit rotation of the take-up member relative to the first ratchet wheel.

The first stacked assembly 222 includes a band member 266 which is formed from a relatively long strip of material. Any suitable material may be used for the band member 266, but the preferred material is high strength steel. The band member 266 has a hook end 268 which is the same shape as the slot 252 in the take-up member 248. Extending from the hook end 268 is a short coil segment of the band member 266 which has a smooth arcuate bend.

Adjacent to the coil segment is a pre-bent segment 272 of the band member 266. The pre-bent segment 272 has a series of relatively sharp bends and has a wave-like appearance. A relatively long coiled segment 274 of the band member 266 extends from the end of the pre-bent segment 272. The coiled segment 274 includes a plurality of coils which extend about the axis 188. The coils overlie each other and have a common center on the axis 188, and thus may be considered concentric. The band member 266 has a trailing end at the end of the radially outermost coil.

The hook end 268 of the band member 266 is located within the slot 252 of the take-up member 248. The coil segment of the band member 266 extends partially along the outer surface of the take-up member 248 and, at a point along the outer surface, the coil segment extends away from the take-up member toward the pin 244. The pre-bent segment 272 is in engagement with the pins 242 and 244 and the protrusion 238. The pre-bent segment 272 extends radially outward of the pin 244, through the gap between the pin 244 and the protrusion 238, along the protrusion, radially outward of the pin 242 and through the gap between the pin 242 and the protrusion. The coiled segment 274 extends through the slot 234 to the outside of the hub portion 232 of the first ratchet wheel 224. The coils extend around the hub portion 232 in a radially expanding spiral.

A second ratchet wheel 280 of the first stacked assembly 222 is coaxial with the axis 188 and is parallel to the disk portion 226 of the first ratchet wheel 224. The second ratchet wheel 280 is made of any suitable material, such as metal. The second ratchet wheel 280 has a plurality of teeth 282 which are located in an annular array extending about the outer radial periphery of the second ratchet wheel. Each tooth 282 has a radially extending abutment face and an intersecting sloped face.

The teeth 282 have the same shape as the teeth 228 on the first ratchet wheel 224 and the number of teeth 282 is the same as the number of teeth 228. The radial distance between the axis 188 and the array of teeth 282 is the same as the radial distance between the axis and the array of teeth 228, and the teeth 282 overlie the teeth 228 in an axial direction. Accordingly, the first and second ratchet wheels 224 and 280 of the first stacked assembly 222 have a diameter smaller than the diameter of the ratchet wheels 214 of the spool assembly 210.

A circular center hole extends through the second ratchet wheel 280 and has a center on the axis 188. The diameter of the center hole of the second ratchet wheel 280 is slightly larger than the diameter of the main portion 190 of the shaft 186. The shaft 186 extends through the center hole of the second ratchet 280 and the second ratchet wheel is rotatable about the axis 188 on the shaft. The first and second ratchet wheels 224 and 280 are fixed together by a suitable means, and rotate together on the shaft 186. The pins 242 and 244 extend into holes (not shown) in the second ratchet wheel 280.

The take-up member 248 and a portion of the band member 266 are axially held within the hub portion 232 of the first ratchet wheel 224 by the second ratchet wheel 280. Also, the coiled segment 274 of the band member 266 is restrained axially on the outside of the hub portion 232 between the disk portion 226 of the first ratchet wheel 224 and the second ratchet wheel 280.

Figure 14:
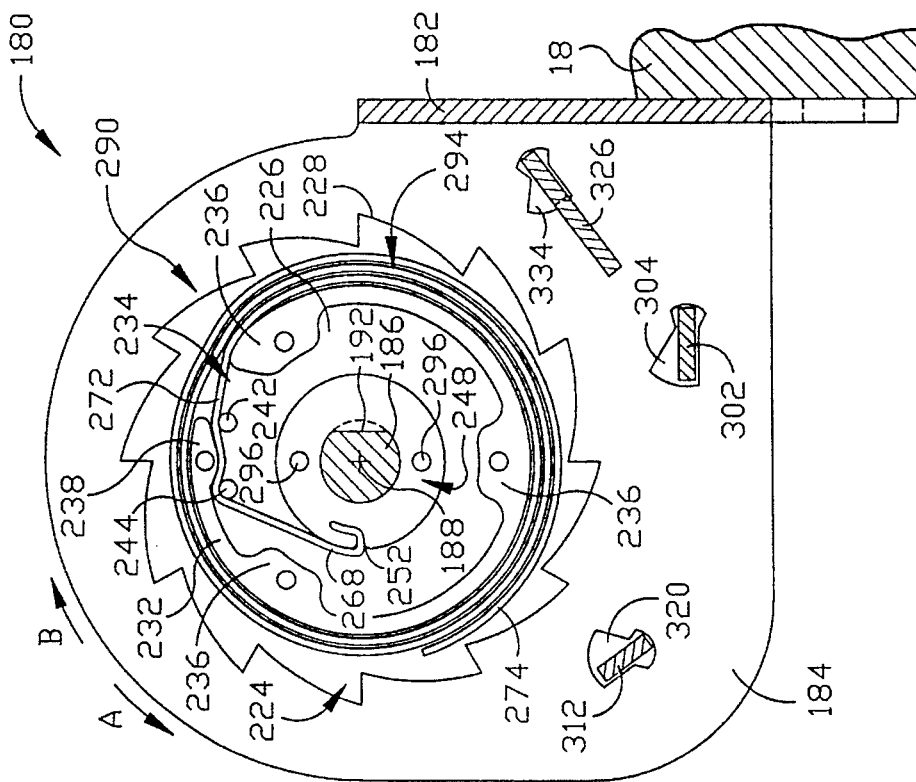
FIG. 14 is a view taken along line 14—14 in FIG. 10.

A second stacked assembly 290 (FIG. 10) of the retractor 180 is located on the main portion 190 of the shaft 186 on the opposite side of the spool assembly 210 from the first stacked assembly 222, and between one side 184 of the frame 182 and the spool assembly. The second stacked assembly 290 is similar to the first stacked assembly 224. Specifically, the second stacked assembly 290 (FIG. 14) has a first ratchet wheel 224, a take-up member 248 and a second ratchet wheel 280 (FIG. 10) which are identical to the corresponding structure within the first stacked assembly 222. Accordingly, identical reference numerals are used on the drawings to identify identical structure.

The second stacked assembly 290 (FIG. 14) differs from the first stacked assembly 222 in that a band member 294 and shear pins 296 differ from the band member 266 (FIG. 13) and the shear pins 258 of the first stacked assembly. The band member 294 (FIG. 14) of the second stacked assembly 290 is similar to the band member 266 (FIG. 13) of the first stacked assembly 222. The band member 294 (FIG. 14) has a hook end 268, a coil segment, a pre-bent segment 272, and a coiled segment 274 shaped like the corresponding portions of the band member 266.

The band member 294 of the second stacked assembly 290 is more resistant to deformation than the band member 266 of the first stacked assembly 222. A greater amount of force is required to deform the band member 294 than to deform the band member 266. The band member 294 may have any suitable structure to provide this desired characteristic. In one preferred embodiment, the band member 294 has the same width as the band member 266, but the thickness of the band member 294 is greater than the thickness of the band member 266.

The shear pins 296 of the second stacked assembly 290 are similar to the shear pins 258 (FIG. 13) of the first stacked assembly 222 in that the shear pins 296 extend between the first ratchet wheel 224 and the take-up member 248 of the second stacked assembly. However, the force which is required to fracture and shear the shear pins 296 is greater than the force required to fracture and shear the shear pins 258.

The retractor 180 (FIG. 10) has a main lock pawl 302 made of suitable material, such as metal. The main lock pawl 302 is located radially outward of the spool assembly 210 and the first and second stacked assemblies 222 and 290. The main lock pawl 302 is a plate which extends between the two sides 184 of the frame 182. The ends of the main lock pawl 302 extend into openings 304 in the sides 184. The openings 304 are shaped to permit pivoting of the main lock pawl 302 to engage the ratchet wheels 214 of the spool assembly 210. The main lock pawl 302 can not engage the first and second ratchet wheels 224 and 280 of the first and second stacked assemblies 222 and 290 because of the larger diameter of the ratchet wheels 214 of the spool assembly 210.

An actuator 306 (schematically shown) of the retractor 180 is located adjacent to the main lock pawl 302. The actuator 306 is a mechanism for causing the main lock pawl 302 to pivot. The actuator 306 may be any suitable mechanism. For example, the actuator 306 may be a mechanical inertia sensitive device which pushes upward on the main lock pawl 302 in response to a sudden change in vehicle velocity which exceeds a predetermined change in velocity, such as occurs during a vehicle collision. Alternatively, the actuator 306 may be an electro-mechanical device which causes the main lock pawl 302 to pivot in response to an electrical signal provided by a sensor mechanism (not shown). The sensor mechanism detects a condition indicative of a vehicle deceleration above a predetermined deceleration, such as occurs in a collision.

The retractor 180 includes a first selective lock pawl 312 which is made of a suitable material, such as metal. The first selective lock pawl 312 (FIG. 12) is a flat plate with two end portions 314, 316 and a tab 318. The tab 318 is intermediate the two end portions 314 and 316, but is located near the end portion 316.

The first selective lock pawl 312 is located radially outward of the spool assembly 210 and the first and second stacked assemblies 222 and 290, and is adjacent to the main lock pawl 302. The first selective lock pawl 312 extends between the two sides 184 (FIG. 10) of the frame 182. The end portions 314 and 316 extend into openings 320 in the sides 184, and the openings are shaped to permit pivoting of the first selective lock pawl 312.

The tab 318 is adjacent to the first stacked assembly 222, and the first selective lock pawl 312 is pivotable to move the tab 318 into engagement with the first and second ratchet wheels 224 and 280 of the first stacked assembly. The first selective lock pawl 312 can not engage the ratchet wheels 214 of the spool assembly 210, or the first and second ratchet wheels 224 and 280 of the second stacked assembly 290. During pivoting of the first selective lock pawl 312, the tab 318 will lockingly engage the first and second ratchets 224 and 280 of the first stacked assembly 222 before other portions of the first selective lock pawl can reach the ratchet wheels 214 of the spool assembly 210 or the first and second ratchet wheels 224 and 280 of the second stacked assembly 290.

A spring 322 (FIG. 11) is associated with the first selective lock pawl 312. The spring 322 biases the first selective lock pawl 312 into engagement with the first and second ratchet wheels 224 and 280 of the first stacked assembly 222. The spring 322 may have any suitable construction. Preferably, the spring 322 is a metal torsion spring with one attached to one of the sides 184 of the frame 182 and the other end attached to the end portion 316 of the first selective lock pawl 312.

The retractor 180 includes a second selective lock pawl 326 (FIG. 12) which is made of a suitable material, such as metal. The second selective lock pawl 326 is a flat plate with two end portions 328, 330 and a tab 332. The tab 332 is intermediate the two end portions 328, 330, but is located near the end portion 328.

The second selective lock pawl 326 is located radially outward of the spool assembly 210 and the first and second stacked assemblies 222 and 290, and is adjacent to the main lock pawl 302 on a side of the main lock pawl opposite to that of the first selective lock pawl 312. The second selective lock pawl 326 extends between the two sides 184 (FIG. 10) of the frame 182. The end portions 328 and 330 extend into openings 334 in the sides 184, and the openings are shaped to permit pivoting of the second selective lock pawl 326.

The tab 332 (FIG. 12) is adjacent to the second stacked assembly 290, and the second selective lock pawl 326 is pivotable to move the tab 332 into engagement with the first and second ratchet wheels 224 and 280 of the second stacked assembly 290. The second selective lock pawl 326 can not engage the ratchet wheels 214 of the spool assembly 210 or the first and second ratchet wheels 224 and 280 of the first stacked assembly 222. During pivoting of the second selective lock pawl 326, the tab 332 will lockingly engage the first and second ratchets 224 and 280 of the second stacked assembly 290 before other portions of the second selective lock pawl 326 can reach the ratchet wheels 214 of the spool assembly 210 or the first and second ratchet wheels 224 and 280 of the first stacked assembly 222.

A spring 336 (FIG. 11) is associated with the second selective lock pawl 326. The spring 336 biases the second selective lock pawl 326 into engagement with the first and second ratchet wheels 224 and 280 of the second stacked assembly 290. The spring 336 may have any suitable construction. Preferably, the spring 336 is a metal torsion spring with one end attached to one of the sides 184 of the frame 182 and the other end attached to the end portion 330 of the second selective lock pawl 326.

Figure 15:
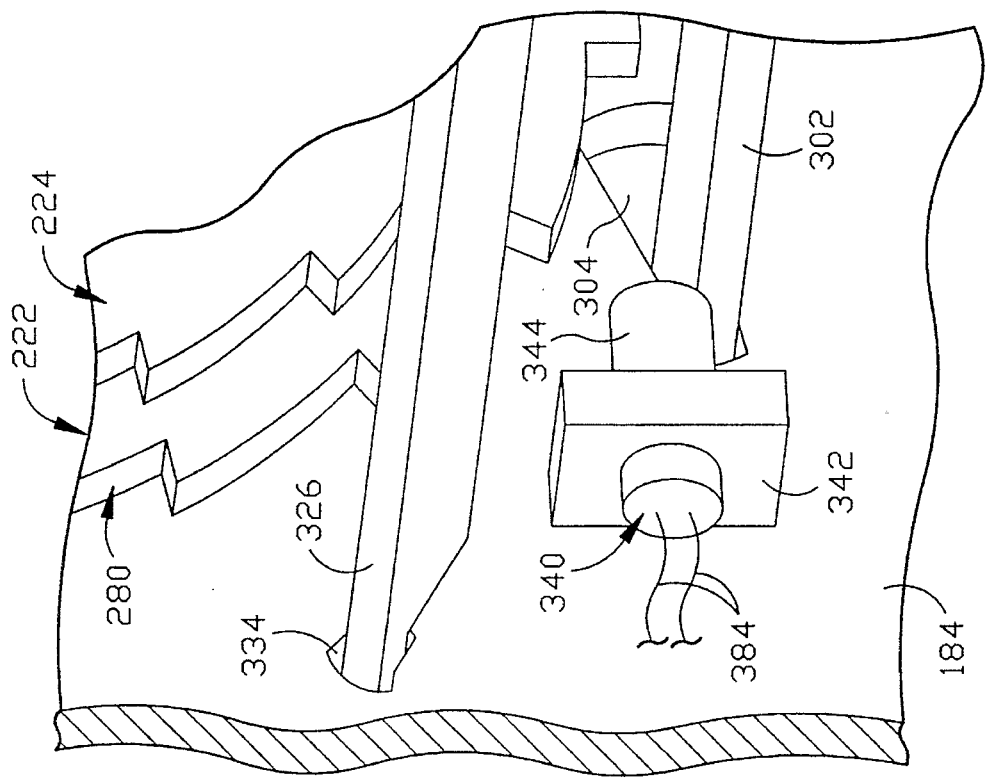
FIG. 15 is an enlarged perspective view of a portion of the retractor of FIG. 10.

A blocking mechanism 340 (FIG. 10) of the retractor 180 is located adjacent to the main lock pawl 302. The blocking mechanism 340 is mounted on a projection 342 extending inward from a side 184 of the frame 182. The blocking mechanism 340 includes a housing 344 (FIG. 15) fixed on the projection 342 of the frame 182 and a pin 346 (FIG. 13) movably disposed within the housing 344.

A means for moving the pin 346 relative to the housing 344 is located within the housing 344. The means for moving the pin may be any suitable means and in one embodiment the means includes a pyrotechnic charge which can be ignited to create a fluid pressure within the housing 344 and push the pin 346 partially out of the housing 344. The pyrotechnic charge is electrically activatable and electrical leads 348 extend to the blocking mechanism 340 for providing an electrical activation signal to the pyrotechnic charge.

The retractor 180 includes a first holding member 352 (FIG. 10). The first holding member 352 holds the first selective lock pawl 312 out of engagement with the first and second ratchet wheels 224 and 280 of the first stacked assembly 222, against the bias provided by the spring 322. The first holding member 352 may have any suitable construction.

Figure 16:
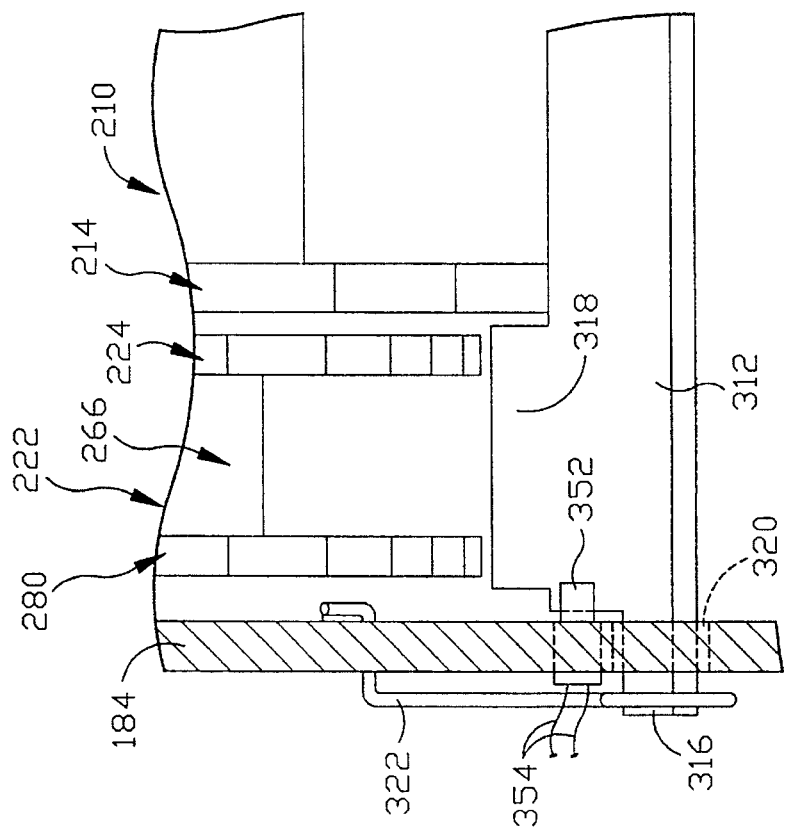
FIG. 16 is an enlarged view of a portion of the retractor of FIG. 10.

In the illustrated embodiment, the first holding member 352 (FIG. 16) is a member which extends through a hole in the side 184 adjacent to the end portion 316 of the first selective lock pawl 312. The first holding member 352 includes an internal pyrotechnic charge (not shown) to provide pressurized fluid, and a means to direct the pressurized fluid to move the first holding member away from the side 184 of the frame 182 and out of the path of movement of the first selective lock pawl 312. For example, the first holding member 352 may have fluid exhaust ports directed toward the outside surface of the side 184. The pressurized fluid would be directed out the exhaust ports against the outside surface of the side 184 to move the first holding member 352. The pyrotechnic charge is electrically activatable and electrical leads 354 extend to the first holding member 352 for providing an electrical activation signal to the pyrotechnic charge.

Figure 11:
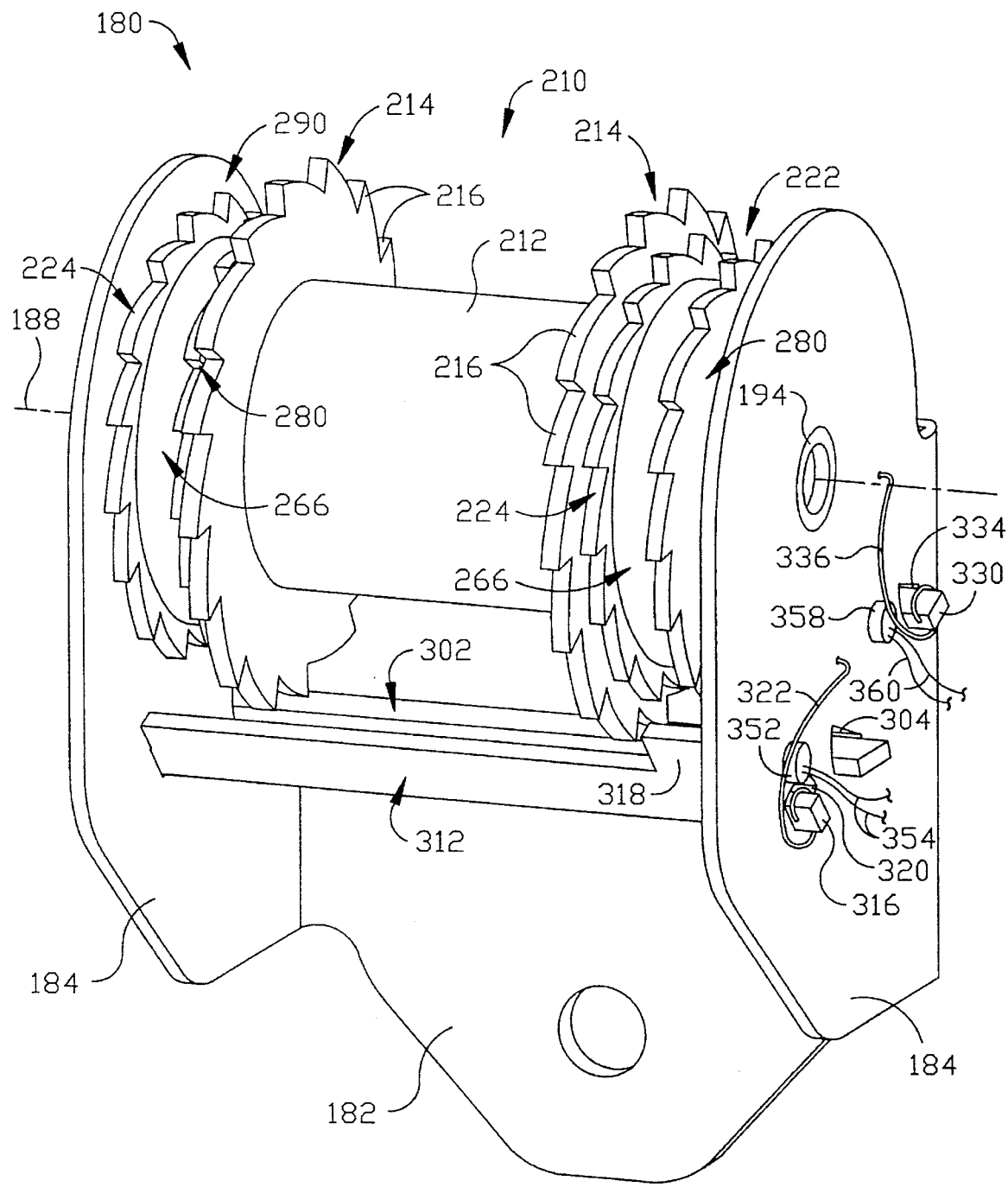
FIG. 11 is a perspective view of the retractor of FIG. 10, with certain parts removed.

The retractor 180 includes a second holding member 358 (FIG. 10). The second holding member 358 holds the second selective lock pawl 326 out of engagement with the first and second ratchet wheels 224 and 280 of the second stacked assembly 290, against the bias provided by the spring 336 (FIG. 11). The second holding member 358 may have any suitable construction.

In the illustrated embodiment, the second holding member 358 is a member which extends through a hole in the side 184 adjacent to the end portion 330 of the second selective lock pawl 326. The second holding member 358 includes an internal pyrotechnic charge (not shown) to provide pressurized fluid, and a means to direct the pressurized fluid to move the second holding member away from the side 184 of the frame 182 and out of the path of movement of the second selective lock pawl 326. The pyrotechnic charge is electrically activatable and electrical leads 360 extend to the second holding member 358 for providing an electrical activation signal to the pyrotechnic charge.

A sensor 366 (schematically shown, FIG. 10) detects a characteristic of the vehicle occupant seated in the seat 14. The characteristic may be the weight of the vehicle occupant or the proximity of the vehicle occupant relative to structure of the vehicle, such as the windshield. Also, the sensor 366 could detect characteristics of the vehicle or characteristics of a collision in which the vehicle is involved. For example, U.S. Pat. No. 5,216,607, assigned to TRW Vehicle Safety Systems Inc., discloses a method and apparatus for sensing a vehicle crash using energy and velocity as measures of crash violence. An example of a characteristic of the vehicle is the speed of the vehicle at the beginning of the collision. Plural sensors could be used to detect plural characteristics of the vehicle occupant and/or the vehicle and/or a collision.

The sensor 366 provides a signal indicative of the detected characteristic to a controller 362 (schematically illustrated). The controller 362 selects and controls which of the main lock pawl 302, and the first and second selective lock pawls 312 and 326 are permitted to pivot. Changing the pawl (or pawls) which is permitted to pivot results in a change in the amount of resistance provided by the retractor 180 against pay-out of the webbing 16 and the amount of energy absorption during payout of the webbing.

A processing unit 364 (schematically shown) of the controller 362 receives the signal from the sensor 366, and determines which of the main lock pawl 302 and the first and second selective lock pawls 312 and 326 are to be permitted to pivot. The processing unit 364 selectively operates three activators 368, 370 and 372 of the controller 362. The activators 368, 370 and 372 provide electrical signals to the blocking mechanism 340, the first holding member 352, and the second holding member 358, respectively. The activators 368, 370 and 372 may have any suitable construction and are schematically shown as including a switch which closes an electrical circuit that includes a power source. The power sources for the activators 368, 370 and 372 are illustrated as being separate from each other. However, a single power source, such as the vehicle battery, may be the power source for all of the actuators 368, 370, and 372.

When a vehicle occupant (not shown) pulls the webbing 16 across his or her torso to secure the webbing, the webbing causes the spool assembly 210 to rotate in the withdrawal direction A. The shaft 186 rotates with the spool assembly 210, against the bias provided by the drive assembly 202. In addition, the take-up members 248 in both the first and second stacked assemblies 222 and 290 rotate with the shaft 186 because of the flat 292 on the shaft.

During the rotation of the take-up member 248 (FIG. 13) of the first stacked assembly 222, the first and second ratchet wheels 224 and 280 of the first stacked assembly rotate with the take-up member. Thus, the first stacked assembly 222 rotates as a unit. The rotation of the first stacked assembly 222 as a unit is the result of the shear pins 258 remaining intact and extending between the first ratchet wheel 224 and the take-up member 248. The position of the take-up member 248 relative to the first and second ratchet wheels 224 and 280 does not change. Also, the position of the band member 266 relative to the take-up member 248 and the first and second ratchet wheels 224 and 280 does not change.

During the rotation of the take-up member 248 (FIG. 14) of the second stacked assembly 290, the first and second ratchet wheels 224 and 280 of the second stacked assembly rotate with the take-up member. Thus, the second stacked assembly 290 rotates as a unit. The rotation of the second stacked assembly 290 as a unit is the result of the shear pins 296 remaining intact and extending between the first ratchet wheel 224 and the take-up member 248. The position of the band member 294 relative to the take-up member 248 and the first and second ratchet wheels 224 and 280 does not change. Thus, the shaft 186, the spool assembly 210, and the first and second stacked assemblies 222 and 290 rotate together as a unit.

When the vehicle is stopped and the vehicle occupant is preparing to leave the vehicle, the webbing 16 (FIG. 10) is released from across the vehicle occupant and the drive assembly 202 biases the shaft 186 to rotate in the retraction direction B. The spool assembly 210 is rotated with the shaft 186 in the retraction direction B such that the webbing 16 is wound onto the spool assembly 210. In addition, the first and second stacked assemblies 222 and 290 rotate as units together with the shaft 186 and the spool assembly 210.

In response to a condition indicative of the collision, the actuator 306 urges the main lock pawl 302 to pivot toward the ratchet wheels 214. The sensor 366 provides a signal to the processing unit 364 of the controller 362. In response to the signal, the processing unit 364 determines whether the main lock pawl 302 should be permitted to pivot or prevented from pivoting into blocking engagement with the ratchet wheels 214 of the spool assembly 210.

Figure 17:
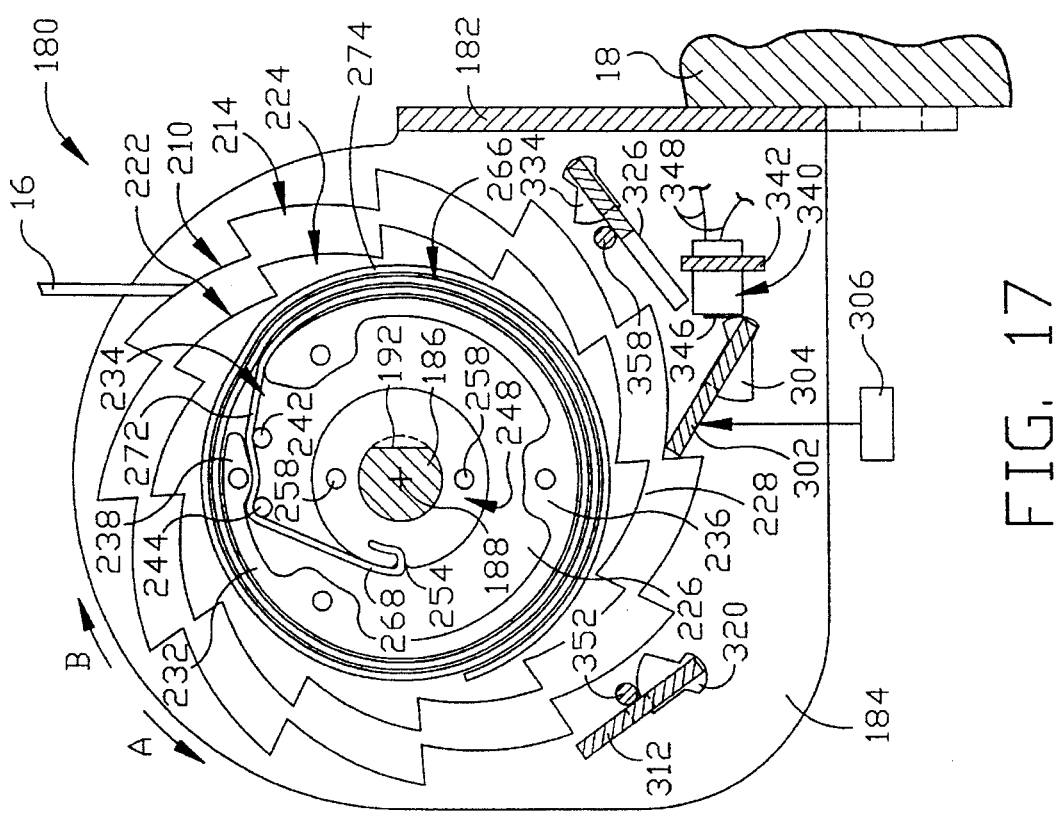
FIG. 17 is a view similar to FIG. 13, but with parts in a different position.

If the processing unit 364 determines that the main lock pawl 302 should pivot, i.e., no amount of webbing 16 should be permitted to be paid out from the spool assembly 210, the processing unit 364 does not cause the actuator 368 to close the electrical circuit. Activation of the blocking mechanism 340 does not occur. The main lock pawl 302 is permitted to pivot upward (FIG. 17) and engage the ratchet wheels 214 and completely block rotation of the spool assembly 210 in the withdrawal direction A. Blocking rotation of the spool assembly 210 prevents webbing payout, and forward movement of the vehicle occupant is arrested by the webbing 16.

The complete resistance to rotation of the spool assembly 210 is useful if the vehicle is involved in a relatively minor collision or if the vehicle occupant is out of a desired position, e.g., too close to the windshield of the vehicle. Also, if an inflatable air bag in the vehicle does not inflate, complete blocking of rotation of the spool assembly 210 in the belt withdrawal direction may be desired.

Figure 18:
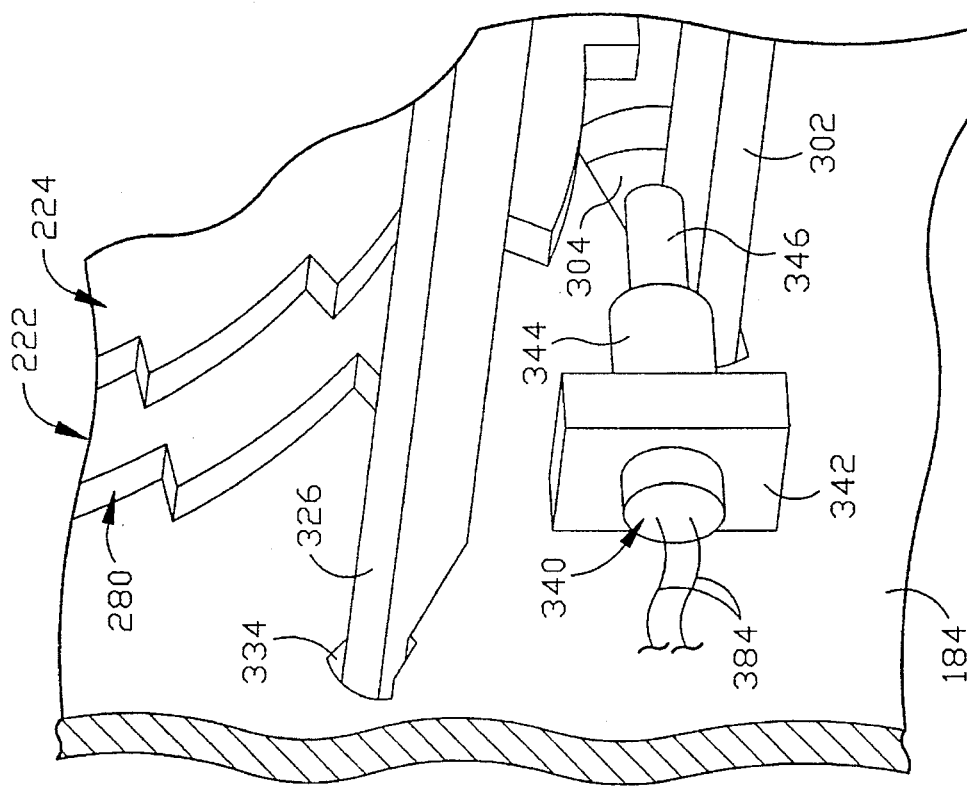
FIG. 18 is a view similar to FIG. 15 but with parts in a different position.

If the processing unit 364 of the controller 362 determines, based upon the signal provided by the sensor 366, that some amount of webbing payout and energy absorption is desirable, the processing unit causes the activator 368 to close the electrical circuit to the blocking mechanism 340. The pyrotechnic charge within the blocking mechanism 340 is ignited and the pin 346 is thrust (FIG. 18) partially out from the housing 344 over the main lock pawl 302. The pin 346 prevents pivoting of the main lock pawl 302 upward. The main lock pawl 302 does not engage the ratchet wheels 214 of the spool assembly 210, and the spool assembly may rotate in the withdrawal direction A. The controller 362 will also cause either or both of the first and second holding members 352 and 358 to move out of the way of the first and second selective lock pawls 312 and 326, respectively.

Figure 19:
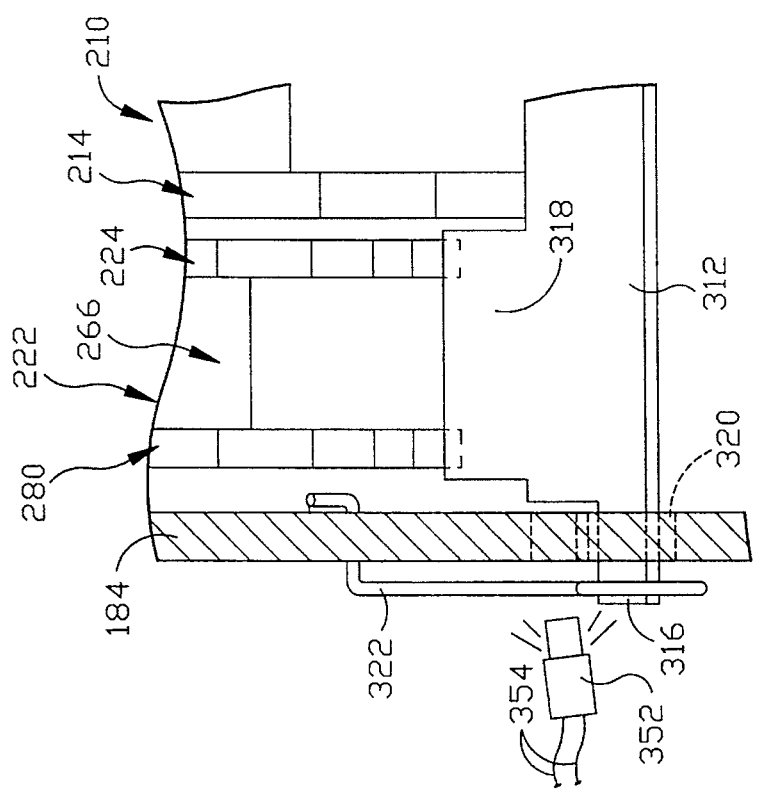
FIG. 19 is a view similar to FIG. 16, but with parts in a different position.

If the processing unit 364 of the controller 362 determines that the first selective lock pawl 312 should pivot and engage the first and second ratchet wheels 224 and 280 of the first stacked assembly 222, the processing unit causes the activator 370 to close the circuit to the first holding member 352. The pyrotechnic charge within the first holding member 352 is ignited and the first holding member 352 is moved out of the way (FIG. 19) of the first selective lock pawl 312. The spring 322 causes the first selective lock pawl 312 to pivot, and the tab 318 engages the first and second ratchet wheels 224 and 280 of the first stacked assembly 222.

The first selective lock pawl 312 prevents rotation of the first and second ratchet wheels 224 and 280 of the first stacked assembly 222. The shear pins 258 on the stationary first ratchet wheel 224 of the first stacked assembly 222 initially prevent further rotation of the take-up member 248 of the first stacked assembly 222 in the withdrawal direction A. The take-up member 248 of the first stacked assembly 222 is initially held stationary with the first and second ratchet wheels 224 and 280 of the first stacked assembly 222. The stationary take-up member 248 initially prevents rotation of the shaft 186. The shaft 186 and the spool assembly 210 are initially prevented from rotating in the withdrawal direction A.

The amount of webbing 16 which extends across a vehicle occupant is momentarily fixed. The vehicle occupant presses upon the webbing 16 because the vehicle occupant tends to move relative to the vehicle during the collision due to inertia, and the tension force in the webbing 16 is increased. The tension force is transmitted to the spool assembly 210 and urges the spool assembly and the shaft 186 to rotate in the withdrawal direction A. The shaft 186 transmits a rotational force to the take-up member 248 within the first stacked assembly 222, and the take-up member presses against the shear pins 258.

Figure 20:
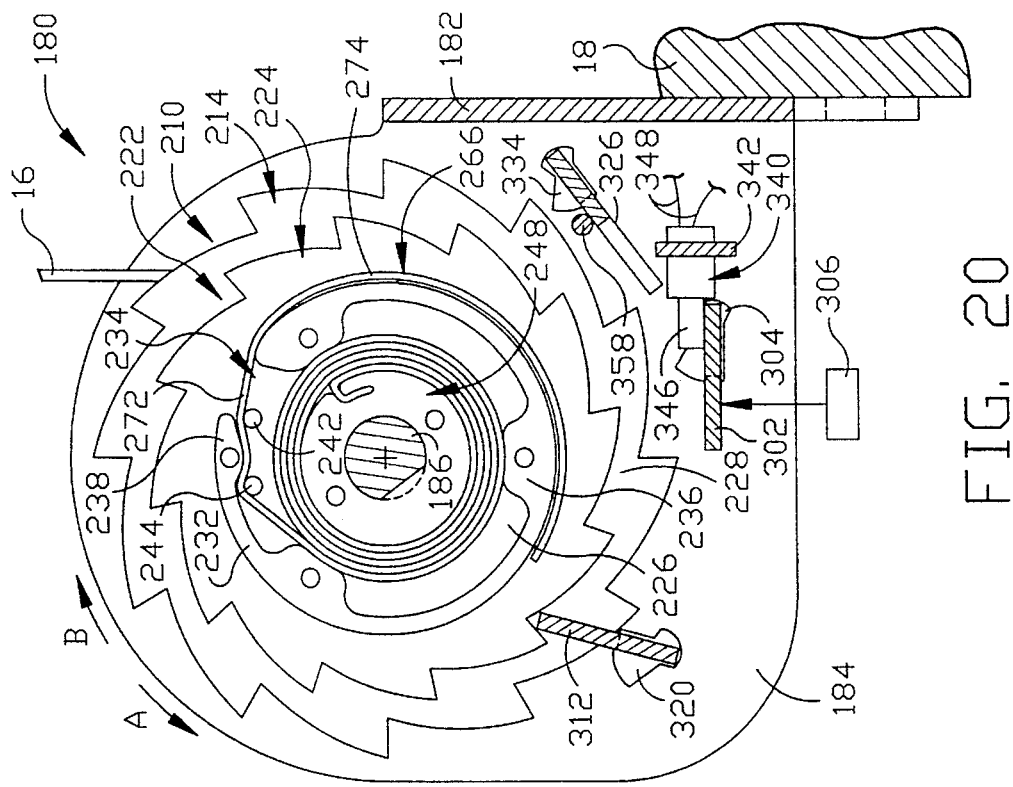
FIG. 20 is a view similar to FIG. 13, but with parts in a different position.

In response to a pressing force from the take-up member 248 above a predetermined amount, the shear pins 258 fracture and shear (FIG. 20). When the shear pins 258 shear, the take-up member is no longer constrained by the shear pins. Thus, the take-up member 248 rotates in the withdrawal direction A with the shaft 186 and the spool assembly 210. The take-up member 248 pulls on the hook end 268 of the band member 266. The band member 266 is urged to move through the tortuous path defined between the pins 242 and 244 and the protrusion 238. As the band member 266 is pulled through the tortuous path, the band member is plastically deformed and absorbs energy. The coils in the coiled segment 274 are sequentially pulled into the interior of the hub portion 232 and deformed, proceeding from the radially innermost coil to the outermost coil.

The take-up member 248 of the first stacked assembly 222 is permitted to rotate for a plurality of rotations against the resistance provided by the band member 266. Each rotation of the take-up member 248 causes a layer of the band member 266 to be added on the periphery of the take-up member 248 within the hub portion 232. As the number of layers of the band member 266 on the take-up member 248 is increased, the distance between the layers and the lobes 236 is decreased. Eventually, the layers of the band member 266 on the take-up member 248 will engage the lobes 236. Rotation of the take-up member 248 of the first stacked assembly 222, and the shaft 186 and the spool assembly 210 will be arrested when an additional layer of the band member 260 will not fit radially within the lobes 236.

The band member 266 is tailored to provide an amount of resistance to movement of smaller vehicle occupants and to absorb an amount of energy for smaller vehicle occupants, e.g., occupants with a weight at or below the fifth weight percentile of the general population.

Figure 22:
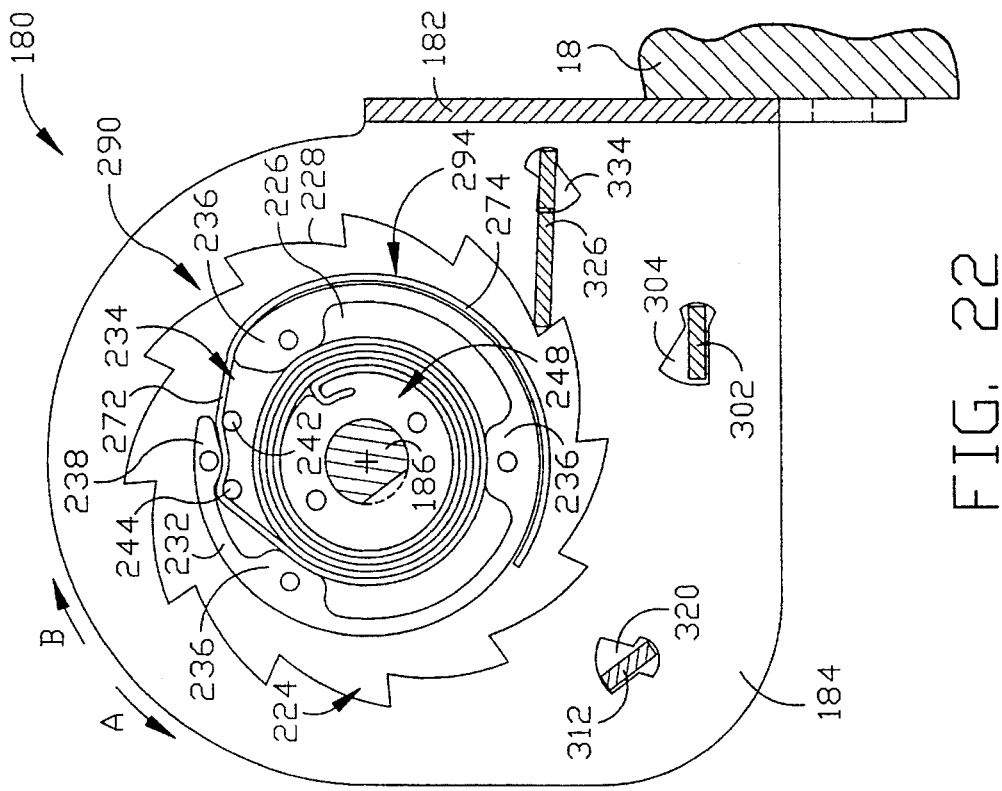
FIG. 22 is a view similar to FIG. 14, but with parts in a different position.
Figure 21:
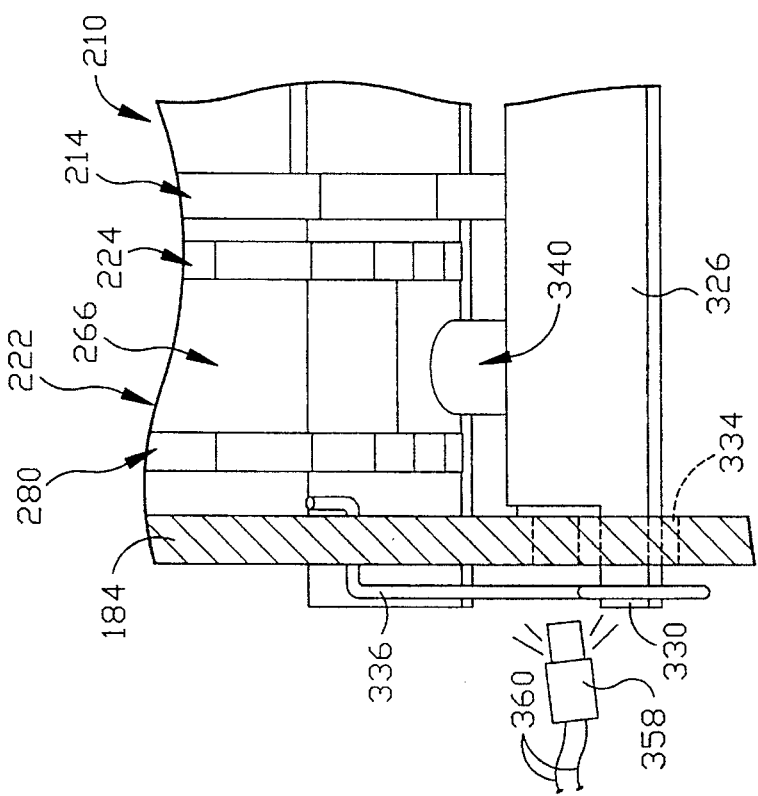
FIG. 21 is an enlarged view of a portion of the retractor of FIG. 10 with certain parts in an activated position.

If the processing unit 364 of the controller 362 determines that the second selective lock pawl 326 (FIG. 10) should pivot and engage the first and second ratchet wheels 224 and 280 of the second stacked assembly 290, the processing unit causes the activator 372 to close the circuit to the second holding member 358. The pyrotechnic charge within the second holding member 358 is ignited and the second holding member is moved out (FIG. 21) of the way of the second selective lock pawl 326. The spring 336 causes the second selective lock pawl 326 (FIG. 22) to pivot, and the tab 332 engages the first and second ratchet wheels 224 and 280 of the second stacked assembly 290.

The second selective lock pawl 312 prevents rotation of the first and second ratchet wheels 224 and 280 of the second stacked assembly 290. The shear pins 296 on the stationary first ratchet wheel 224 of the second stacked assembly 290 initially prevent rotation of the take-up member 248 of the second stacked assembly 290 in the withdrawal direction A. The take-up member 248 of the second stacked assembly 290 is held stationary with the first and second ratchet wheels 224 and 280 of the second stacked assembly 290. The stationary take-up member 248 initially prevents rotation of the shaft 186, and the shaft 186 and the spool assembly 210 are initially prevented from rotating in the withdrawal direction A.

The amount of webbing 16 which extends across a vehicle occupant is momentarily fixed. The vehicle occupant presses upon the webbing 16 because the vehicle occupant tends to move relative to the vehicle during a collision due to inertia, and the tension force in the webbing 16 is increased. The tension force is transmitted to the spool assembly 210 and urges the spool assembly and the shaft 186 to rotate in the withdrawal direction A. The shaft 186 transmits a rotational force to the take-up member 248 of the second stacked assembly 290, and the take-up member presses against the shear pins 296.

When the pressing force from the take-up member 248 reaches a predetermined amount, the shear pins 296 fracture and shear, and the take-up member is no longer constrained by the shear pins. The take-up member 248 then rotates in the withdrawal direction A with the shaft 186 and the spool assembly 210.

The take-up member 248 pulls on the hook end 268 of the band member 294. The band member 294 is urged to move through the tortuous path defined between the pins 242 and 244 and the protrusion 238. As the band member 294 is pulled through the tortuous path, the band member is plastically deformed and absorbs energy. The coils in the coiled segment 274 are sequentially pulled into the interior of the hub portion 232 to be deformed, proceeding from the radially innermost coil to the outermost coil.

The take-up member 248 of the second stacked assembly 290 is permitted to rotate for a plurality of rotations against the resistance provided by the band member 294. Each rotation of the take-up member 248 causes a layer of the band member 294 to be added on the outside of the take-up member 248 within the hub portion 232. As the number of layers of the band member 294 on the take-up member 248 is increased, the distance between the layers and the lobes 236 is decreased. Eventually, the coil layers on the take-up member 248 will engage the lobes 236. Rotation of the take-up member 248 of the second stacked assembly 290, and the shaft 186 and the spool assembly 210 will be arrested when an additional layer of the band member 294 will not fit radially within the lobes 236.

The band member 294 is tailored to absorb a greater amount of energy than absorbed by the band member 266. This amount of energy absorbed during deformation of the band member 266 permits payout of the webbing 16 and energy absorption for an average size vehicle occupant, e.g., an occupant with a weight approximately at the fiftieth weight percentile for the general population.

If the processing unit of the controller 362 determines that it would be advantageous to permit payout of webbing 16 from the spool assembly 210 with a relatively large resistance and a relatively large amount of energy absorption, the processing unit 364 causes both the activator 370 and the activator 372 to close the circuits for both the first and second holding members 352 and 358. The first selective lock pawl 312 moves into engagement with the first and second ratchet wheels 224 and 280 of the first stacked assembly 222. The second selective lock pawl 326 moves into engagement with the first and second ratchet wheels 224 and 280 of the second stacked assembly 290. The spool assembly 210 is permitted to rotate against the resistance provided by both the band members 266 and 294. Energy absorption occurs simultaneously in the first and second stacked assemblies 222 and 290. Resistance from both band members 266 and 294 is useful for an occupant of relatively large weight, e.g., a weight equal to or greater than a ninety-fifth percentile person.

From the above description of the invention, those skilled in the art will perceive improvements, changes and modifications. Such improvements, changes and modifications within the skill of the art are intended to be covered by the appended claims.

Having described the invention, the following is claimed:

1. A seat belt webbing retractor comprising:
   a spool around which seat belt webbing is wound, said spool being rotatable in webbing withdrawal and webbing retraction directions;
   a member rotatable in the withdrawal and retraction directions with said spool;
   means for blocking rotation of said rotatable member and said spool in the withdrawal direction, said spool being rotatable relative to said rotatable member upon the occurrence of tension in the webbing above a predetermined amount;
   a deformable member for absorbing energy during a plurality of rotations of said spool relative to said rotatable member, said deformable member having a plurality of coils; and
   means for effecting plastic deformation of said coils of said deformable member during the plurality of rotations of said spool relative to said rotatable member.

2. A retractor as set forth in claim 1, wherein said rotatable member is a ratchet wheel, and said means for blocking rotation of said rotatable member includes a pawl engageable with said ratchet wheel.

3. A retractor as set-forth in claim 1, wherein said coils of said deformable member spiral radially outward and are deformed sequentially from a radially innermost coil to a radially outermost coil.

4. A retractor as set forth in claim 1, further including a take-up member rotatable with said spool relative to said rotatable member for pulling said deformable member to effect deformation of said deformable member.

5. A retractor as set forth in claim 4, wherein said rotatable member has a surface segment on which said coils of said deformable member are located, and said take-up member winds said deformable member on said take-up member as said take-up member rotates with said spool relative to said rotatable member.

6. A retractor as set forth in claim 4, wherein said means for effecting plastic deformation of said deformable member includes pins on said rotatable member, said take-up member pulling said deformable member through a tortuous path defined by said pins.

7. A retractor as set forth in claim 6, wherein said means for effecting plastic deformation of said deformable member includes a surface segment of said rotatable member, said pins and said surface segment of said rotatable member defining the tortuous path.

8. A retractor as set forth in claim 4, wherein said rotatable member has a portion for supporting said deformable member, said portion of said rotatable member being hollow, and said deformable member is coiled outside of said hollow portion prior to deformation and is coiled inside of said hollow portion subsequent to deformation.

9. A retractor as set forth in claim 8, wherein said take-up member is located inside said hollow portion of said rotatable member.

10. A retractor as set forth in claim 9, wherein said hollow portion has surface means for engaging the coils of said deformable member for stopping rotation of said spool and said take-up member after said deformable member is deformed.

11. A retractor as set forth in claim 8, wherein said hollow portion of said rotatable member has an annular wall and a slot through said wall, said deformable member extending into said hollow portion through said slot.

12. A retractor as set forth in claim 11, wherein said rotatable member and said annular wall are formed as one piece.

13. A retractor as set forth in claim 1, further including:
   a second rotatable member, said second rotatable member being rotatable in the withdrawal and retraction directions with said spool;
   means for blocking rotation of said second rotatable member and said spool in the withdrawal direction, said spool being rotatable relative to said second rotatable member upon occurrence of tension in the webbing above a second predetermined amount;

a second deformable member; and means for effecting plastic deformation of said second deformable member during rotation of said spool relative to said second rotatable member.

14. A retractor as set forth in claim 13, wherein said second deformable member absorbs energy during a plurality of rotations of said spool relative to said second rotatable member.

15. A retractor as set forth in claim 14, wherein said second deformable member has a plurality of coils.

16. A retractor as set forth in claim 15, wherein said coils of said second deformable member spiral radially outward and are deformed sequentially from a radially innermost coil to a radially outermost coil.

17. A retractor as set forth in claim 13, further including a second take-up member, said second take-up member being rotatable with said spool relative to said second rotatable member for pulling said second deformable member to effect deformation of said second deformable member.

18. A retractor as set forth in claim 1, further including means for stopping rotation of said spool relative to said rotatable member after said deformable member is deformed.

19. A seat belt webbing retractor comprising:

a spool around which seat belt webbing is wound, said spool being rotatable in webbing withdrawal and webbing retraction directions;

a member rotatable in the withdrawal and retraction directions with said spool;

means for blocking rotation of said rotatable member and said spool in the withdrawal direction, said spool being rotatable relative to said rotatable member upon the occurrence of tension in the webbing above a predetermined amount;

a deformable member for absorbing energy during a plurality of rotations of said spool relative to said rotatable member, said deformable member having a plurality of coils; and means for deforming said deformable member during the plurality of rotations of said spool relative to said rotatable member;

said rotatable member having a hollow portion, said deformable member being coiled outside of said hollow portion prior to deformation and being coiled inside of said hollow portion subsequent to deformation.

20. A retractor as set forth in claim 19, wherein said rotatable member is a ratchet wheel, and said means for blocking rotation of said rotatable member includes a pawl engageable with said ratchet wheel.

21. A retractor as set forth in claim 19, wherein said means for deforming said deformable member effects plastic deformation of said deformable member.

22. A retractor as set forth in claim 19, further including a take-up member rotatable with said spool relative to said rotatable member for pulling said deformable member to effect deformation of said deformable member.

23. A retractor as set forth in claim 22, wherein said rotatable member has a surface segment on which said coils of said deformable member are located, and said take-up member winds said deformable member on said take-up member as said take-up member rotates with said spool relative to said rotatable member.

24. A retractor as set forth in claim 22, wherein said means for deforming said deformable member includes pins on said rotatable member, said take-up member pulling said deformable member through a tortuous path defined by said pins.

25. A retractor as set forth in claim 22, wherein said means for deforming said deformable member includes surface means on said rotatable member for defining a tortuous path.

26. A retractor as set forth in claim 22, wherein said take-up member is located inside said hollow portion of said rotatable member.

27. A retractor as set forth in claim 22, wherein said hollow portion of said rotatable member has an annular wall and a slot through said wall, said deformable member extending into said hollow portion through said slot.

28. A retractor as set forth in claim 19, wherein said coils of said deformable member spiral radially outward and are deformed sequentially from a radially innermost coil to a radially outermost coil.

29. A retractor as set forth in claim 19, further including:

a second rotatable member, said second rotatable member being rotatable in the withdrawal and retraction directions with said spool;

means for blocking rotation of said second rotatable member and said spool in the withdrawal direction, said spool being rotatable relative to said second rotatable member upon the occurrence of tension in the webbing above a second predetermined amount;

a second deformable member; and means for effecting plastic deformation of said second deformable member during rotation of said spool relative to said second rotatable member.

30. A retractor as set forth in claim 29, wherein said second deformable member has a plurality of coils.

31. A retractor as set forth in claim 30, wherein said coils of said second deformable member spiral radially outward and are deformed sequentially from a radially innermost coil to a radially outermost coil.

32. A retractor as set forth in claim 31, further including a second take-up member, said second take-up member being rotatable with said spool relative to said second rotatable member for pulling said second deformable member to effect deformation of said second deformable member.

33. A retractor as set forth in claim 19, further including means for stopping rotation of said spool relative to said rotatable member after said deformable member is deformed.

34. A seat belt webbing retractor comprising:

a spool around which seat belt webbing is wound, said spool being rotatable about an axis in webbing withdrawal and webbing retraction directions;

means for absorbing energy during rotation of said spool in the withdrawal direction upon vehicle deceleration above a predetermined deceleration, including a deformable means and means for deforming said deformable means when said spool rotates in the withdrawal direction upon vehicle deceleration above the predetermined deceleration; and means for changing the amount of energy absorption by said means for absorbing energy.

35. A retractor as set forth in claim 34, wherein said deformable means includes a plurality of deformable members, said means for changing the amount of energy absorption includes means for selectively controlling deformation of said plurality of deformable members.

36. A retractor as set forth in claim 35, wherein said plurality of deformable members includes first and second deformable members, and said means for selectively controlling deformation of said plurality of deformable members includes means for effecting deformation of either said first or said second deformable member.

37. A retractor as set forth in claim 36, wherein said means for selectively controlling deformation of said plurality of deformable members includes means for effecting deformation of either said first or said second deformable member or both of said first and second deformable members.

38. A retractor as set forth in claim 36, wherein said first deformable member has a plurality of coils and is plastically deformed by said means for deforming said first deformable member, said second deformable member has a plurality of coils and is plastically deformed by said means for deforming said second deformable member.

39. A retractor as set forth in claim 34, including:

a first ratchet wheel rotatable in the withdrawal and retraction directions;

a second ratchet wheel rotatable in the withdrawal and retraction directions;

a first pawl engageable with said first ratchet wheel for blocking rotation of said first ratchet wheel and said spool in the withdrawal direction, said spool being rotatable relative to said first ratchet wheel upon the occurrence of tension in the webbing above a first predetermined amount; and a second pawl engageable with said second ratchet wheel for blocking rotation of said second ratchet wheel and said spool in the withdrawal direction, said spool being rotatable relative to said second ratchet wheel upon the occurrence of tension in the webbing above a second predetermined amount.

\* \* \* \* \*